United States Patent
Koseki et al.

(10) Patent No.: US 6,732,124 B1
(45) Date of Patent: May 4, 2004

(54) DATA PROCESSING SYSTEM WITH MECHANISM FOR RESTORING FILE SYSTEMS BASED ON TRANSACTION LOGS

(75) Inventors: Michihiko Koseki, Kawasaki (JP); Mamoru Yokoyama, Kawasaki (JP); Masashi Sumi, Kawasaki (JP); Satoru Yamaguchi, Kawasaki (JP); Sadayoshi Taniwaki, Kawasaki (JP); Seishiro Hamanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/501,568

(22) Filed: Feb. 9, 2000

(30) Foreign Application Priority Data

Mar. 30, 1999 (JP) .......................................... 11-087457

(51) Int. Cl.$^7$ .............................................. G06F 17/30
(52) U.S. Cl. ...................... 707/202; 707/200; 707/100; 707/102; 714/15; 714/16; 711/119; 711/120; 711/142; 711/152; 711/161; 711/162
(58) Field of Search ................................ 707/200–205, 707/7–9, 1, 100–104.1; 714/15–20, 7; 711/113–115, 119–120, 145–147, 100, 161–162, 142–143, 152; 709/211, 215–216, 223–225, 229; 710/200; 705/404

(56) References Cited

U.S. PATENT DOCUMENTS

| | | | | |
|---|---|---|---|---|
| 5,636,360 A | * | 6/1997 | Courts et al. ................ 710/200 |
| 5,640,561 A | * | 6/1997 | Satoh et al. ................. 707/202 |
| 5,715,447 A | * | 2/1998 | Hayashi et al. ................ 707/8 |
| 5,778,168 A | | 7/1998 | Fuller ........................... 714/18 |
| 5,832,516 A | * | 11/1998 | Bamford et al. ............. 707/202 |
| 5,870,757 A | | 2/1999 | Fuller ......................... 707/201 |
| 5,897,641 A | * | 4/1999 | Ruddy et al. ................ 707/100 |
| 5,897,661 A | * | 4/1999 | Baranovsky et al. ........ 711/170 |
| 5,999,930 A | * | 12/1999 | Wolff ........................... 707/10 |
| 6,119,208 A | * | 9/2000 | White et al. ................. 711/111 |
| 6,144,999 A | * | 11/2000 | Khalidi et al. ............... 709/219 |
| 6,185,663 B1 | * | 2/2001 | Burke ......................... 707/202 |
| 6,341,341 B1 | * | 1/2002 | Grummon et al. .......... 711/162 |

* cited by examiner

Primary Examiner—Srirama Channavajjala
(74) Attorney, Agent, or Firm—Greer, Burns & Crain, Ltd.

(57) ABSTRACT

A data processing system having an efficient logging mechanism which stores log records for repairing a file system when its consistency is lost. When there is a transaction attempting to update metadata stored in metadata volumes, a metadata loading unit reads the requested metadata objects out of the volumes and loads them to a metadata cache. At that time, a metadata manager updates its internal database to record from which metadata volume each metadata object has been fetched. Each time the transaction updates a metadata object in the cache, a log collection unit collects a copy of the updated metadata object, together with a volume ID which indicates its home metadata volume. The collected data is temporarily stored in a log buffer, and finally saved into a log volume by a log writing unit.

9 Claims, 23 Drawing Sheets

LOG RECORD FORMAT

DATA PROCESSING SYSTEM WITH MECHANISM FOR RESTORING FILE SYSTEMS BASED ON TRANSACTION LOGS

BACKGROUND OF THE INVENTION

1. Field of the Invention

The present invention relates to a data processing system with capabilities to recover its file systems, and also to a computer-readable medium storing a program designed therefor. More particularly, the present invention relates to a data processing system which can recover from system failures by using log records to restore the consistency of its file system structure, as well as to a computer-readable medium storing-a program providing such failure recovery functions.

2. Description of the Related Art

A computer system fails for various reasons, often introducing some inconsistencies in its file system structure. In the event of an abnormal shutdown, the computer system has to be rebooted, and the file system is entirely scanned to test whether any inconsistent entry has been produced. If any problem is found in this test, the computer system applies an appropriate modification to the file system in question, thereby restoring its consistency.

Scanning an entire file system, however, takes a long time, hampering a prompt failure recovery of the computer system. To reduce the down time, many of the modern computer operating systems (OS), such as UNIX OS, employ a certain mechanism to restore the file systems by using transaction logs. That is, any modifications or updates made to data in a computer file system are recorded in a log (or journal) file, and in case of a system failure, the file system would be restored through the process of scanning the log file and reapplying recorded updates to their destinations. The use of such a transaction logging mechanism reduces the system's down time theoretically, but at the same time, it poses several technical challenges as described below.

(1) Supporting Multi-volume Secondary Storage

Besides handling files themselves, the file systems have to manage what is called "metadata." The term "metadata," denoting "data about data" literally, refers herein to such data that describes the location, size, and other information about each file stored in a computer's secondary storage unit. While metadata objects are also stored in a prescribed portion of a secondary storage unit, they are normally read out to the main memory of the computer system for the purpose of faster access and manipulation. In other words, metadata is cached on the computer's main memory. Updated metadata objects are written back to the secondary storage unit at predetermined intervals, so that every modification made to the cached metadata will be reflected in their original entities in the secondary storage unit some time later. To ensure the successful recovery of file systems, it is mandatory for the logging system to save all recent records of such metadata modifications into its dedicated secondary storage subsystem before the cache contents are copied back to the secondary storage unit.

Some systems have a plurality of secondary storage units to provide for larger file systems. In such systems, a single file system operation may manipulate metadata objects managing multiple secondary storage units. To log this file system operation, conventional logging systems record every modification made on the metadata cache memory. However, the log records collected in this way would not serve satisfactorily, because it would take much time for the computer system to search the log records for relevant metadata objects stored in different secondary storage units. This means that the conventional logging systems are not effective in reducing the down time in such environments where metadata objects are distributed in multiple secondary storage units.

(2) Time for Scanning of Log Records

Another factor that delays the file system recovery is the time required for searching the entire log storage to find the oldest log record. This issue will be discussed below.

The logging system interacts with individual transactions which constitute a file system operation, and it collects records solely for such transactions that have committed, or successfully finished. To ensure this scheme, most file systems with a logging mechanism are configured to assign a sequence number to each transaction. When restoring such file systems, the logging system attempts to identify the oldest transaction on the basis of sequence numbers affixed to the stored log records. The logging system then starts a log replay from the identified point.

Log records should be saved in a dedicated secondary storage device, in preparation for possible system failures. While log records are produced endlessly, the storage for them is limited in size. This suggests that the logging system must reuse the limited storage resource in a cyclical manner, and to do so, it has to overwrite old records with new ones. In actuality, many of the stored log records are obsolete (i.e., not to be used to restore the file system), while the others are essential for file system recovery. Scanning the entire log storage to identify the oldest transaction means reading and testing many obsolete log records. This is obviously inefficient.

(3) Sequence Number Overflow

When searching for the oldest transaction, the system presupposes that the sequence numbers increase monotonously; they will never overflow or return to zero during logging operations. Typical logging systems prevent the sequence number from overflowing or wrapping around by reinitializing the log storage to zeros, when a file system restoration process is completed, or when it is detected that the sequence number will soon overflow. Such logging systems then resume their operation, restarting the sequence number from zero. However, it takes a long time to reinitialize the entire log storage, during which the computer systems are unable to provide their services. If they are working as servers, the interrupt of services would pose intolerable stress to their clients.

While the above three problems (1) to (3) relate to the restoration of a file system, the introduction of a logging system can even cause adverse effects to normal operations of the target computer systems. More specifically, there are several known techniques to realize high-speed access to secondary storage devices for logging purposes, which include log spooling on memory and sequential access optimized for specific disk structures. However, with those techniques alone, usable file recovery systems cannot be realized. Rather, to make such systems truly practical, it is necessary to develop more enhanced log collection and storage methodologies. Otherwise, computer systems would suffer from considerable penalties in throughput and storage efficiencies. The following will enumerate several specific issues that must be addressed.

(4) Increased Secondary Storage Traffic

It is often seen that a single transaction updates the same data object a number of times. The system may produce a log record each time an update occurs, but this log collection practice consumes more memory resources, as well as raises input/output traffic from/to the secondary storage unit for logging.

(5) Logging of Concurrent Transactions

The logging system collects information on what updates have been made by individual transactions and records a set of such updates each time one transaction is completed, because the log must preserve the correct order of transaction executions. This generally means that no transactions can update a specific data object if it is being manipulated by another ongoing transaction. It may be relatively easy to implement this rule in the case of handling individual files; a plurality of transactions can proceed concurrently, while maintaining exclusive access to each file. However, the concurrent execution of transactions can be a challenge, when a plurality of transactions manipulate data controlling multiple files, such as a resource allocation map used to assign a storage space, etc.

Suppose, for example, that one transaction A was freeing up its allocated space, while another transaction B needed a free space, and as a result, the space freed by A has been reallocated to B. The logging system collects records from both transactions A and B and saves them to log storage when each transaction commits. Here, the resource allocation map, which represents the status of all storage blocks in bitmap form, is used to control allocation and deallocation of storage resources. In the present case, the log record of transaction A contains a bit indicating that the space is free, whereas the same bit in the log record of transaction B shows that the same space is in use. It is now assumed that the system has to restore the file system after an abnormal shutdown. This situation can be potentially problematic, depending on the timing of the system shutdown. Recall that, in the present example, transaction A released the space before transaction B gets it. However, if transaction B committed before transaction A, and if the system failed without writing the record of transaction A, then the resultant log file would include a record of resource allocation to transaction B, but nothing about the releasing operation done by transaction A. When used to restore the file system, this transaction log would bring about a conflicting situation where the storage space in question is allocated to both A and B, because there is no record showing that transaction A has released it.

Another pattern of system shutdown is such that the system crashes before saving the log of transaction B. This also causes an erroneous situation in the restored file system, where the storage space in question is not allocated to either of them, because the log of transaction A frees up the space that actually has been allocated to transaction B.

The both situations described above must be avoided. Although the problem may be solved by simply restricting the concurrent execution of multiple transactions, it will certainly pose a considerable penalty in the throughput of file systems running on a multi-task operating system.

(6) Independence Between Transactions

As previously noted, it is a primary objective to provide a logging mechanism which recovers file systems in a short time. However, as a result of giving priority to this, not a few file systems ignore the independence between transactions, or behave as if they were healthy in spite of their imperfect recoverability. Conventional metadata management systems use a single memory area for caching log records collected from the entire file system. In such systems, a log record of one transaction may be confused with that of another transaction, lacking appropriate mechanisms to ensure the independence between transactions. The problem is serious particularly in handling of a resource allocation map as described in the previous item (5).

(7) Non-uniform Log Data Size

The lengths of resulting logs may be different from transaction to transaction. For example, a transaction that updates the timestamp of a file will only produce a tiny log record. In contrast, a transaction that creates a large data file will inevitably leave a long log record. Although a plurality of log buffers are provided to accommodate logs of different transactions, conventional logging systems do not care about the unevenness of log data sizes.

(8) Limited Cache Memory Capacity

No matter how efficiently used, the main memory is limited in size. Naturally, the log cache memory created on the main memory is limited, and it is definitely smaller than the amount of log records to be produced by transactions.

(9) Ensuring Operation Semantics

The logging system and failure recovery mechanism should maintain a meaningful flow of operations, or operation semantics, when restoring file systems. This implies that every log record represents a consistent state of a file system sampled at the end of a transaction. Therefore, such a log record only containing a halfway history of a transaction would not work at all, because it fails to guarantee the operation semantics of the transaction.

(10) Cache Memory Exhaustion

System failures, if happened in the middle of a transaction, would create a critical situation for a file system. As previously stated, in a computer system having logging capabilities, the cache manager cannot force out the updated metadata objects until their corresponding log records are saved to the log volume. When the log cache memory is filled with collected records, it implies that the metadata cache is also highly loaded. The trouble is that the ongoing transactions cannot be finished without enough memory resources. They could hang if memory resources were exhausted.

(11) Log Storage Exhaustion

The problem discussed in the previous item (10) also applies to the secondary storage for log files. During transactions, newly produced log records consumes this log storage capacity. However, the logging system cannot erase old log records unless their corresponding metadata cache entries are written back to their home locations. If one wishes to suppress the I/O traffic between the metadata cache and metadata storage, more records should be kept in the log storage. Valid log records can grow in this way. While even an average secondary storage device provides much larger capacity than cache memory does, it is still possible that many concurrent transactions would lead to exhaustion of log storage, in addition to shortage of metadata cache or log cache.

SUMMARY OF THE INVENTION

Taking the above into consideration, an object of the present invention is to provide a data processing system having file system recovery functions which work more efficiently.

To accomplish the above object, according to the present invention, there is provided a data processing system with a logging mechanism which stores log records for repairing an inconsistent file system. This system comprises the following elements:

(a) a primary storage subsystem;

(b) a secondary storage subsystem;

(c) a plurality of metadata volumes, created in the secondary storage subsystem, which store a plurality of metadata objects describing files;

(d) a log volume which is created in the secondary storage subsystem to store log records describing updates made to the metadata objects;

(e) a metadata cache which is created in the primary storage subsystem to temporarily store the metadata objects;

(f) a metadata loading unit which, in response to a transaction attempting to update metadata objects, loads the requested metadata objects from the metadata volumes to the metadata cache;

(g) a metadata manager which holds metadata volume identifiers associated with the metadata objects loaded to the metadata cache, where the metadata volume identifiers indicate in which of the metadata volumes the metadata objects were stored;

(h) a log collection unit which collects log records indicating what updates were made to the metadata objects in the metadata cache, where each log record contains the metadata volume identifiers corresponding to the updated metadata objects;

(i) a log buffer which stores the log records collected by the log collection unit; and (j) a log writing unit which transfers the log records from the log buffer to the log volume.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1:
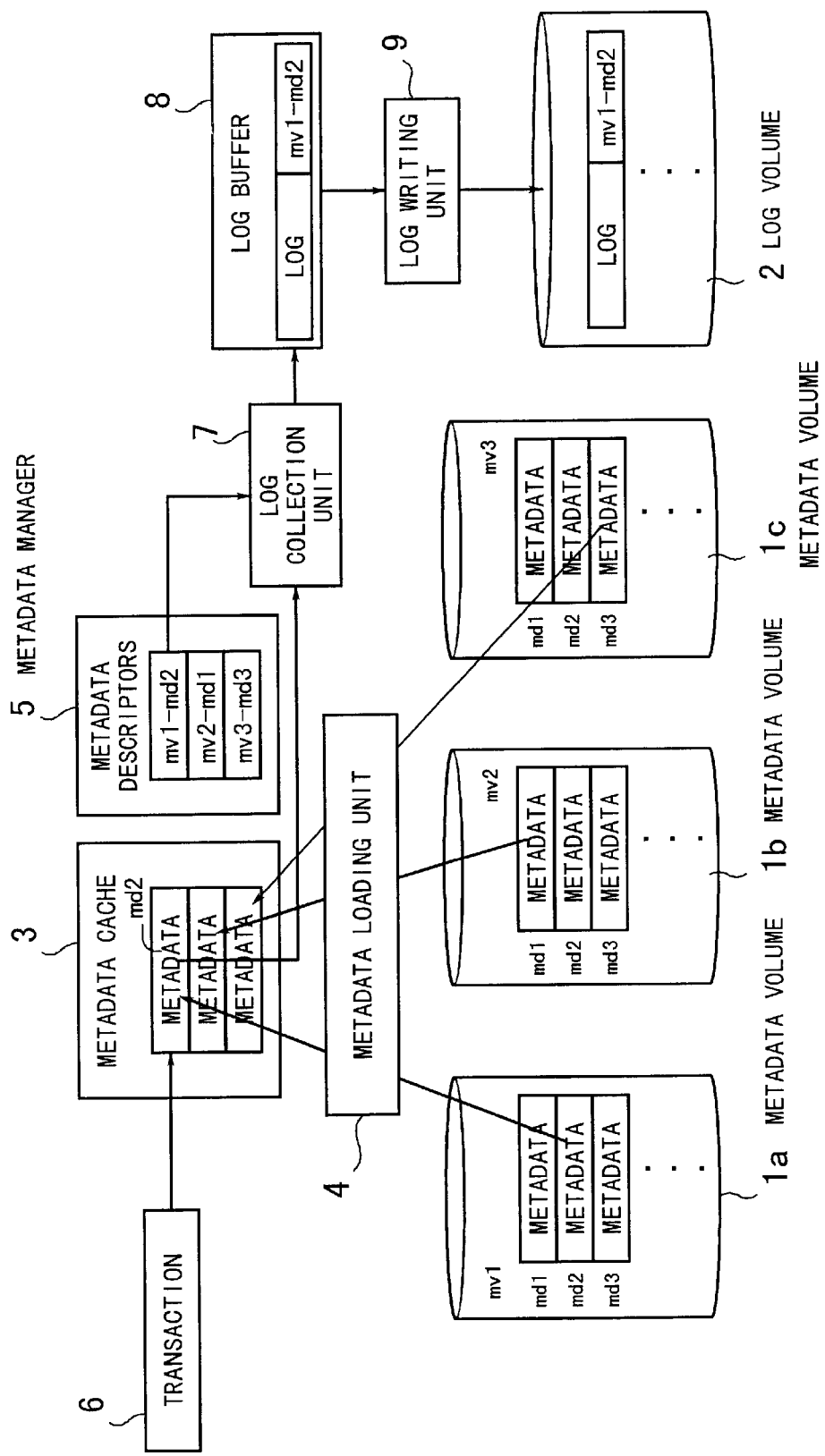
FIG. 1 is a conceptual view of a first aspect of the present invention.

Referring first to FIG. 1, the concept of a first aspect of the invention is shown. According to this first aspect of the invention, a data processing system has an enhanced function to restore the consistency in its file system where a plurality of secondary storage units are employed to store metadata. The system of FIG. 1 is equipped with multiple secondary storage units including three metadata volumes 1a, 1b, and 1c, and a log volume 2. The metadata volumes 1a to 1c store metadata objects describing computer files (not shown), while the log volume 2 keeps log information which records what updates have been made to those metadata objects. A metadata cache 3, located on the computer's main memory, is a temporary storage space which holds a replica of metadata objects read out of the metadata volumes 1a to 1c.

The data processing system of FIG. 1 further comprises: a metadata loading unit 4, a metadata manager 5, a log collection unit 7, a log buffer 8, and a log writing unit 9. The metadata loading unit 4 reads out a metadata object from its home location (i.e., metadata volume) and loads it to the metadata cache 3, when it is accessed by a transaction 6. To manage the cached metadata objects, the metadata manager 5 holds metadata descriptors, each of which contains the identifier (ID) of a metadata volume associated with each metadata object in the metadata cache 3. The transactions 6 is a process making access to the metadata cache 3 to update one or more metadata objects cached therein. The log collection unit 7 collects log information to record what modifications have been applied to the metadata in the metadata cache 3, together with the identifier of either of the metadata volumes 1a, 1b, and 1c relevant to the metadata object of interest. The log buffer 8 holds such log records collected by the log collection unit 7, and the log writing unit 9 transfers them from the log buffer 8 to the log volume 2, as needed.

More specifically, the above-described data processing system will operate as follows. Suppose here that the transaction 6 is attempting to update a specific metadata object md2 stored in the metadata volumes 1a. If the requested object md2 is not found in the metadata cache 3, the metadata loading unit 4 reads it out of its relevant metadata volume 1a and supplies it to the metadata cache 3. At this time, the metadata manager 5 updates its internal database (metadata descriptors) to record from which metadata volume the metadata object has been fetched. When the transaction 6 completes the update of the metadata object md2, the log collection unit 7 creates a log record by copying the updated metadata object, including the relevant metadata volume identifier mv1 from the metadata manager 5. This log record is stored in the log buffer 8 and then written into the log volume 2 by the log writing unit 9.

As such, every log record entry in the log volume 2 has a relevant metadata volume identifier, which makes it easy for the system to find which metadata volume was involved in the logged transaction. This feature enables the system to correct inconsistencies in its file system, even when the metadata objects are distributed in multiple volumes.

Figure 2:
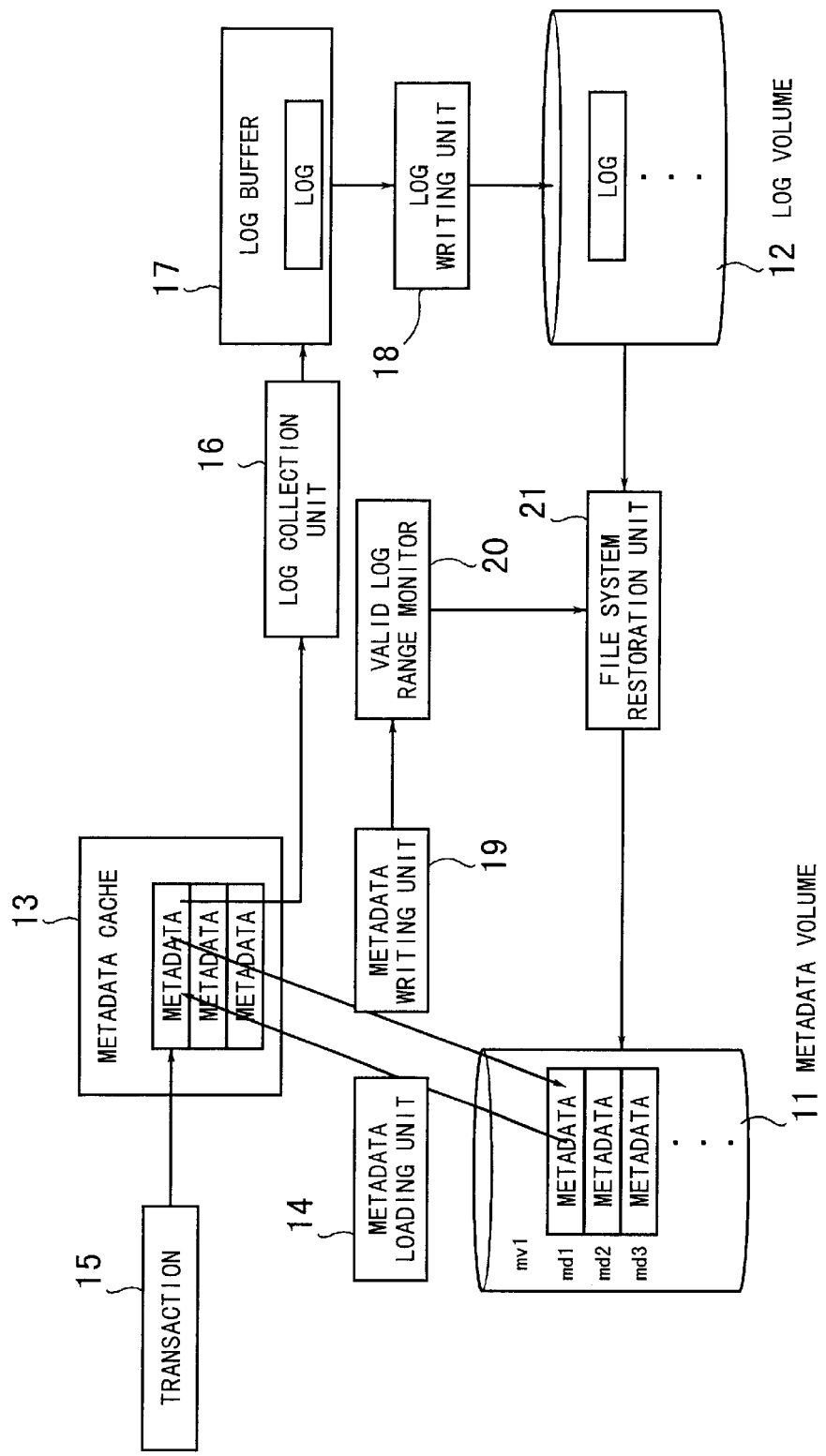
FIG. 2 is a conceptual view of a second aspect of the present invention.

Referring next to FIG. 2, the concept of a second aspect of the present invention is shown. According to this second aspect of the invention, the data processing system keeps track of which part of the log volume contains valid log records, in order to make file system recovery more efficient. Main elements of the proposed system are described below.

The system has a metadata volume 11, which is a secondary storage unit storing metadata objects describing computer files (not shown). Any updating operations applied to those objects are recorded in a log file and stored in a log volume 12, which is another secondary storage unit employed for this special purpose. A metadata cache 13 is provided as part of the computer's main memory to hold a copy of metadata objects from the metadata volume 11. To fill this metadata cache 13, a metadata loading unit 14 reads out metadata objects from the metadata volume 11, when a transaction 15 demands them. The transaction 15 modifies the copy in the metadata cache 13, instead of directly manipulating the original in the metadata volume 11.

A log collection unit 16 collects log information, i.e., what modifications have been made to the metadata objects in the metadata cache 13. Such log records are accumulated in a log buffer 17, and a log writing unit 18 transfers them from the log buffer 17 to the log volume 12 on a regular basis. Here, the log volume 12 is used circularly (i.e., old entries are overwritten with new ones) because of its limited capacity. On the other hand, a metadata writing unit 19 is responsible for transferring metadata objects from the metadata cache 13 back to the metadata volume 11. This write back operation is observed by a valid log range monitor 20. Based on the observation, it determines which metadata updates have been reflected in the metadata volume 11. If there are such updates that have not been reflected yet, the valid log range monitor 20 regards their corresponding log records in the log volume 12 as "valid."

After an abnormal system shutdown, a file system restoration unit 21 repairs the file system in response to a file system restoration request from an external source. More specifically, it retrieves from the log volume 12 the log records being flagged as "valid" and then corrects inconsistencies in the metadata volume 11 by using those valid log records. Here, the "valid" flags may be implemented alternately as a parameter called the "valid log range" which is written by the valid log range monitor 20 in some non-volatile memory (e.g., part of the log volume 12). If this is the case, the file system restoration unit 21 first makes access to the non-volatile memory to read out the valid log range, and then extract all log records within the given range of the log volume 12.

More specifically, the operation of the proposed data processing system will now be described below, assuming the transaction 15 attempting to update one of the metadata objects stored in the metadata volume 11. The metadata loading unit 14 responds to the transaction 15 by reading out the requested metadata object and loads it to the metadata cache 13. When the transaction 15 completes its intended update to the metadata object, the log collection unit 16 creates a log record by collecting the updated metadata object. After being stored in the log buffer 17, this log record is written into the log volume a secondary storage unit storing metadata objects describing computer files (not shown). Every modification made to those metadata objects is recorded in a log and stored in a log volume 32, which is another secondary storage unit employed for this special purpose. A metadata cache 33 is provided on the computer's main memory to serve as a temporary storage space for holding a copy of metadata objects. To fill this metadata cache 33, a metadata loading unit 34 reads out metadata objects from the metadata volume 31, when a transaction 35 demands them. The transaction 35 actually modifies this copy in the metadata cache 33, instead of directly manipulating the original in the metadata volume 31. A log collection unit 36 collects log records which show what modifications have been done to the metadata objects in the metadata cache 33. The log records collected by the log collection unit 36 are held in a log buffer 37, and a log writing unit 38 transfers them to the log volume 32.

The system further employs a sequence number assignment unit 30b, which assigns a unique sequence number to each log record when the log writing unit 38 writes it to the log volume 32. This sequence number is monotonously increased each time a new log record is written. In the case of an abnormal system shutdown, a file system restoration unit 39 restores the file system by correcting inconsistencies in the metadata volume 31, based on the log records in the log volume 32. An initial 12 by the log writing unit 18. Later, the metadata writing unit 19 transfers the updated metadata object back to the metadata volume 11. The valid log range monitor 20 observes this write transfer operation, comparing it with the log records stored in the log volume 12. When the content of a log record has not yet been reflected in its relevant metadata volume 11, the valid log range monitor 20 flags this log record as "valid."

Suppose here that the system has crashed and its file system has been damaged. When a file system restoration request is received from an external source, the file system restoration unit 21 reads out valid log records from the log volume 12. With those valid log records, it then corrects inconsistencies detected in the metadata volume 11. In this way, the proposed data processing system restores its file system in a more efficient manner by selectively using valid log records in the log volume 12.

Figure 3:
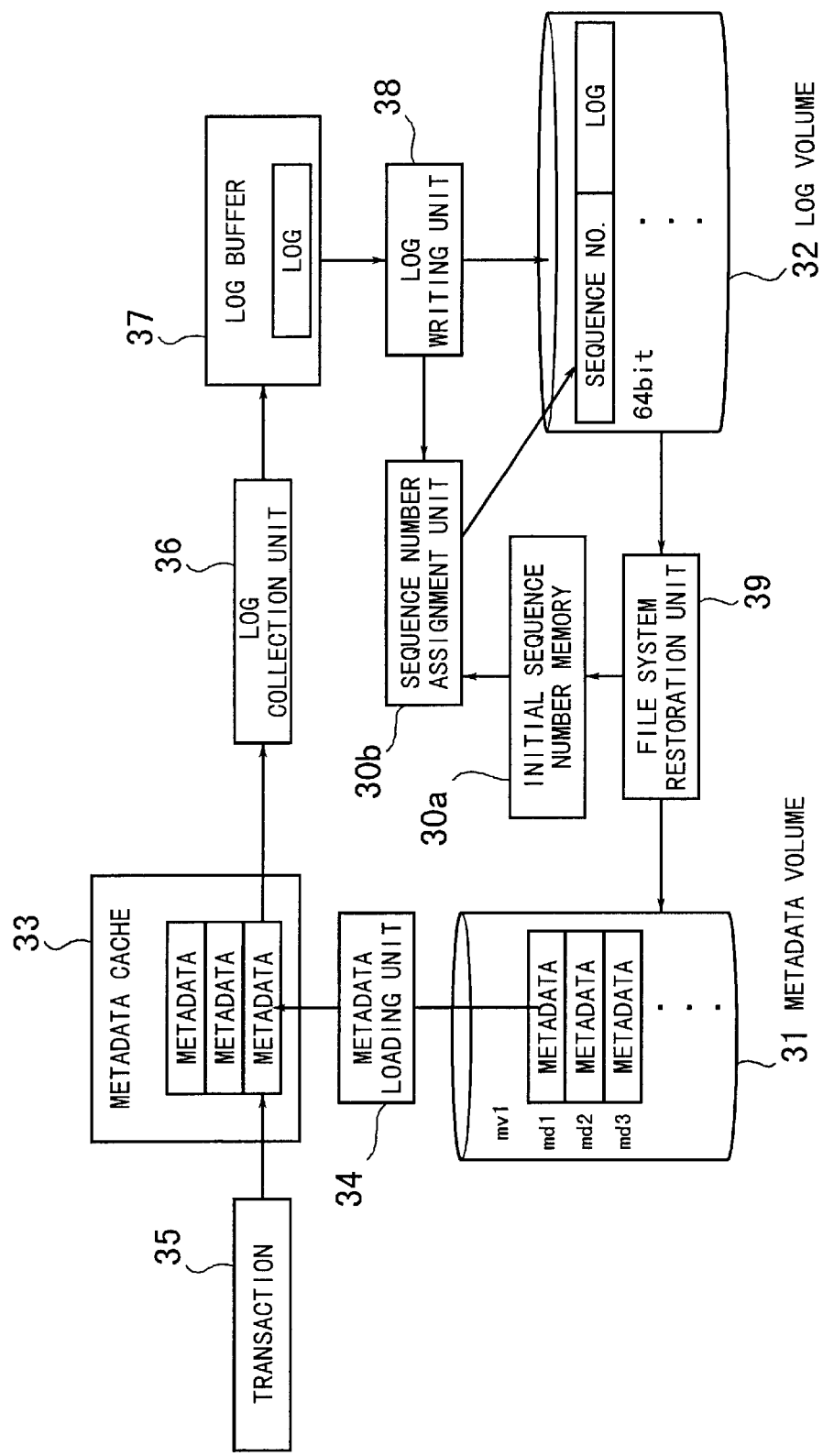
FIG. 3 is a conceptual view of a third aspect of the present invention.

Referring next to FIG. 3, the concept of a third aspect of the present invention is shown. According to this third aspect of the invention, the data processing system provides each log record with a sequence number having many digits so that the number will monotonously increase during the system's lifetime. This eliminates the need for clearing the log volume to zeros. The proposed system comprises several elements described below.

The system provides a metadata volume 31, which is sequence number memory 30a holds the sequence number of the last log record that the file system restoration unit 39 used in the file system recovery. This sequence number is passed to the sequence number assignment unit 30b, when it resumes after a system failure. The sequence number assignment unit 30b uses it as the initial value of sequence numbers to be assigned.

The above-described data processing system will operate as follows. Assume here that the transaction 35 is attempting to update a specific metadata object stored in the metadata volume 31. In response to this event, the metadata loading unit 34 reads out the requested metadata object and loads it to the metadata cache 33. When the transaction 35 completes its intended update, the log collection unit 36 creates a log record that represents the updated metadata object. After being stored temporarily in the log buffer 37, this new log record is written into the log volume 32 by the log writing unit 38. At this time, the sequence number assignment unit 30b supplies the log record with a sequence number that is greater than the previous one. When any inconsistency is found in the metadata objects stored in the metadata volume 31, the file system restoration unit 39 corrects it by using relevant log records read out of the log volume 32. Here, the initial sequence number memory 30a captures the sequence number of the last log record used. After that, the sequence number assignment unit 30b resumes its operation, assigning a sequence number to each new log record when the log writing unit 38 saves it to the log volume 32. This series of sequence numbers starts with the number held in the initial sequence number memory 30a.

The proposed mechanism ensures that newly produced log records will be numbered just consecutively, without overlapping with those assigned to old log records used in the recent file system restoration. As a result, the data processing system can be freed from the task of reinitializing the log volume, throughout its product lifetime. With this time-consuming task eliminated, the system can resume its operation without extra delay.

Figure 4:
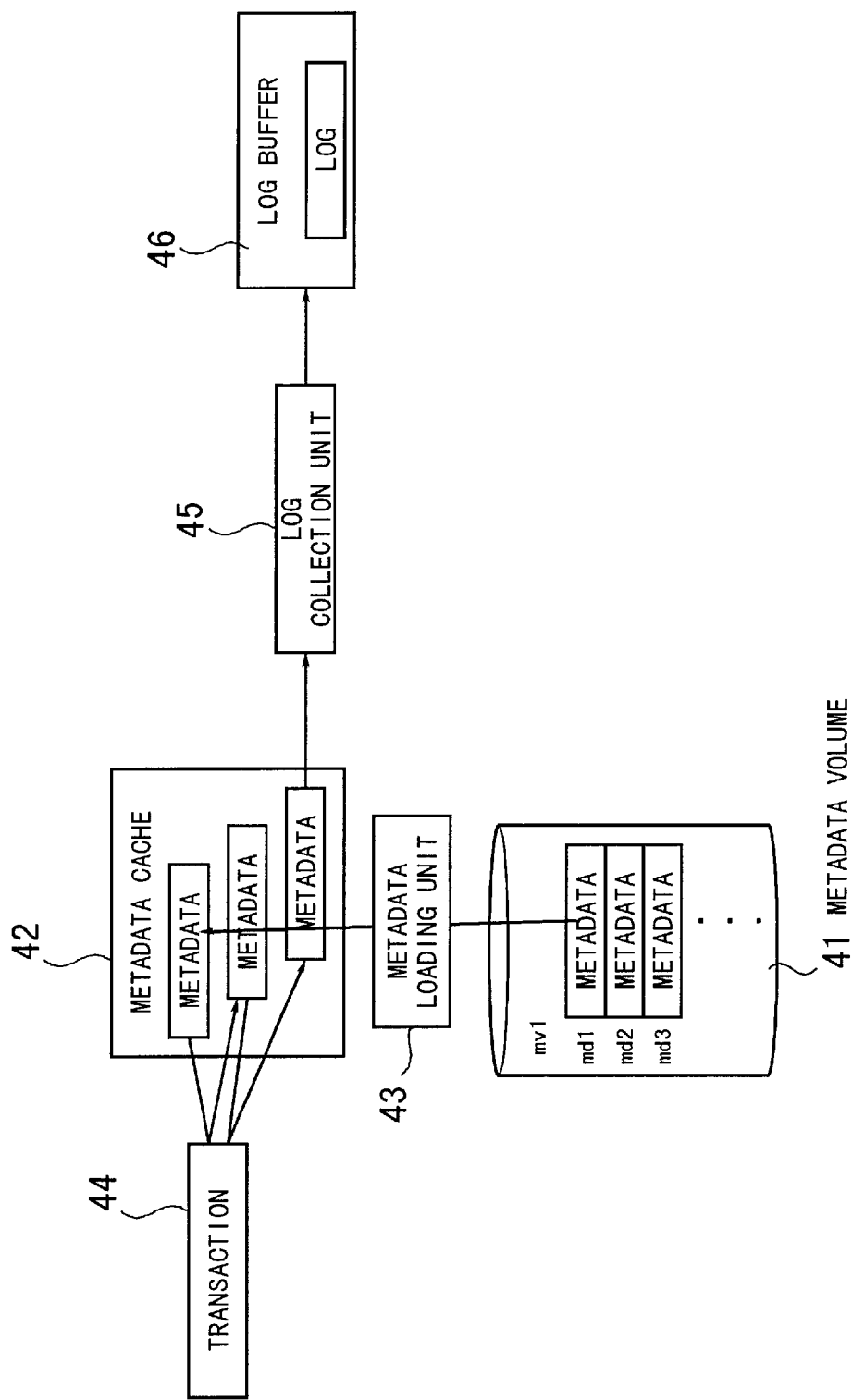
FIG. 4 is a conceptual view of a fourth aspect of the present invention.

Referring to FIG. 4, the concept of a fourth aspect of the present invention is shown. According to this fourth aspect of the invention, the data processing system is designed to record only the final consistent state of a metadata object even when a transaction has made multiple modifications to it. Main elements related to this feature are as follows.

The system has a metadata volume 41, which is a secondary storage unit storing metadata objects describing computer files (not shown). A metadata cache 42 is provided as part of the computer's main memory to hold a copy of metadata objects from the metadata volume 41. A metadata loading unit 43 reads out a specific metadata object from the metadata volume 41 to the metadata cache 42, when a transaction 44 demands it. The transaction 44 actually modifies this copy in the metadata cache 42, instead of directly manipulating the original in the metadata volume 41.

The proposed system employs a log collection unit 45 to collect log information. More specifically, the log collection unit 45 examines the type of each newly started transaction to determine whether it is likely to make two or more modifications to a single metadata object. If the transaction 44 is of this kind, the log collection unit 45 grabs only the final state of updated metadata objects in the metadata cache 42. Log records collected in such a manner are accumulated in a log buffer 46.

The data processing system configured as above will operate as follows. Suppose that the transaction 44 is attempting to update metadata objects stored in the metadata volume 41. In response to this event, the metadata loading unit 43 reads out the demanded metadata objects and loads them into the metadata cache 42. The transaction 44 now performs update operations to the metadata objects in the metadata cache 42. The log collection unit 45 then identifies the type of the transaction 44 to determine what kind of metadata it may update multiple times. If the transaction 44 is expected to make multiple modifications to a specific metadata object, the log collection unit 45 decides to create a log record only at the end of the transaction 44, rather than producing a record each time the metadata object of that kind is updated. The log records collected in this way are entered to the log buffer 46.

The above-described feature of the present invention will permit the logging system to record only the final state of a metadata object even when a transaction makes multiple modifications to that object. Besides improving memory utilization, this feature reduces the I/O traffic from a log buffer to a log volume.

Figure 5:
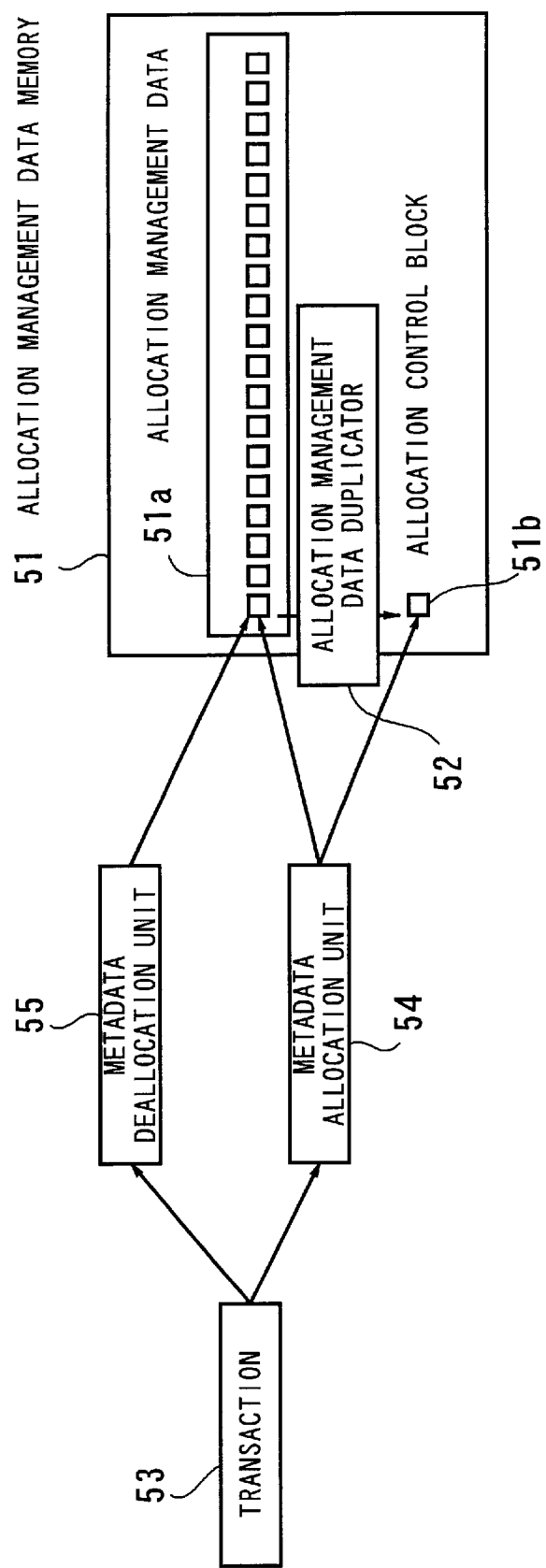
FIG. 5 is a conceptual view of a fifth aspect of the present invention.

Referring to FIG. 5, the concept of a fifth aspect of the present invention is shown. According to this fifth aspect of the invention, the data processing system is designed to prevent a transaction from reserving a metadata object that has just been released by another transaction. Briefly, this feature is accomplished by: (1) partly duplicating metadata allocation management data to permit a transaction to reserve metadata only within the scope of the duplicated management data, and (2) allowing the transaction to free up the metadata by updating solely the original management data. To implement the above resource allocation mechanism, the proposed system comprises several elements described below.

An allocation management data memory 51 holds allocation management data 51a for controlling the usage of metadata resources. This allocation management data 51a consists of a plurality of data blocks, allowing an allocation management data duplicator 52 to produce a copy of one such block. The produced copy, referred to as the "allocation control block" 51b, contains one or more entries representing free metadata objects. If those free metadata object entries are exhausted, the allocation management data duplicator 52 creates a copy of another block and re-assigns it as the allocation control block 51b.

A transaction 53 activates the mechanism of FIG. 5 by issuing a metadata allocation request or a metadata deallocation request. A metadata allocation unit 54 responds to the metadata allocation request by searching the allocation control block 51b to find a free metadata object. If a free object is found, then it updates both the allocation management data 51a and allocation control block 51b to flag the object as "in use." On the other hand, a metadata deallocation unit 55 handles a metadata deallocation request from the transaction 53, updating the allocation management data 51a to reset the specified metadata object to the "free" state.

The data processing system configured as above will operate as follows. First, the allocation management data duplicator 52 produces an allocation control block 51b, which is a partial copy of the allocation management data 51a. When a transaction 53 issues a metadata allocation request, the metadata allocation unit 54 reserves a free metadata object after searching the allocation control block 51b. It then updates both the allocation management data 51a and allocation control block 51b accordingly. After that, the transaction 53 issues a metadata deallocation request. Upon receipt of this request, the metadata deallocation unit 55 frees up the specified metadata object, updating solely the allocation management data 51*a*. Notice here that free metadata entries in the allocation control block 51*b* will be monotonously reduced. When they are completely exhausted, the allocation management data duplicator 52 creates a copy of another data block of the allocation management data 51*a* and assigns it as a new allocation control block 51*b*.

The above mechanism prevents any metadata object from being reserved immediately after its release from another transaction, since no freeing operations will affect the allocation control block 51*b*. This mechanism is advantageous in that, if the system crashes when a transaction is about to free up a specific metadata object, the system can recover its former state at least before the metadata object is released.

Figure 6:
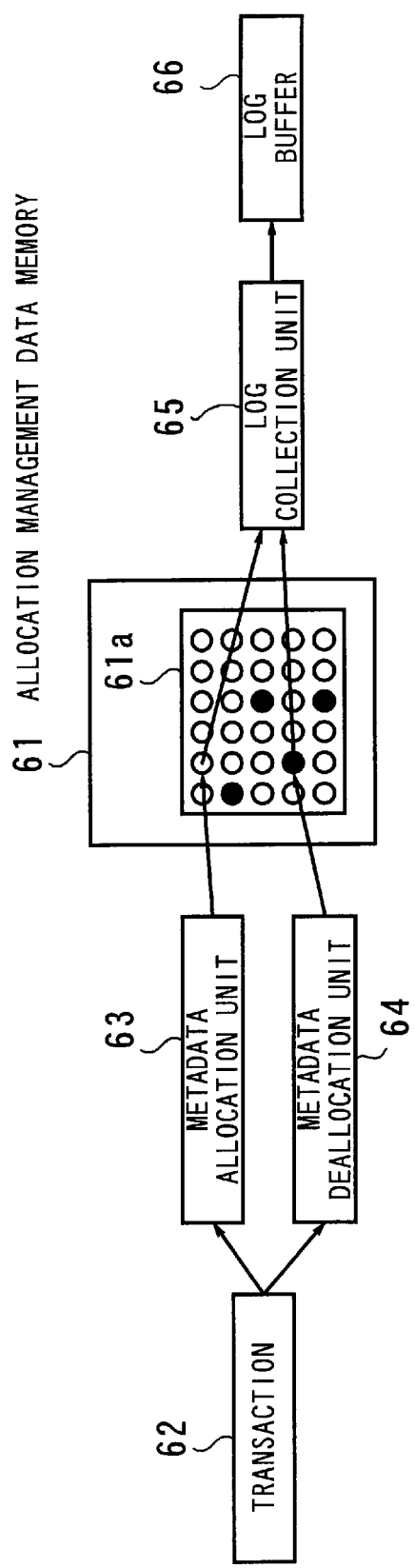
FIG. 6 is a conceptual view of a sixth aspect of the present invention.

Referring to FIG. 6, the concept of a sixth aspect of the present invention is shown. According to this sixth aspect of the invention, the data processing system records the locations of allocated or deallocated resources, rather than taking a snapshot of the entire allocation management data. Besides saving memory, this proposed method prevents the allocation management data from falling into an inconsistent state as a result of replaying a log of concurrent transactions.

This system of FIG. 6 is triggered by a metadata allocation request or metadata deallocation request sent from a transaction 62. An allocation management data memory 61 holds allocation management data 61*a* for controlling the allocation of metadata objects. A metadata allocation unit 63 responds to a metadata allocation request by searching the allocation management data 61*a* to find and allocate a free metadata object to the requesting transaction 62, as well as updating the allocation management data 61*a* to indicate that the metadata object is being used. A metadata deallocation unit 64, on the other hand, responds to a metadata deallocation request from the transaction 62, updating a corresponding bit in the allocation management data 61*a* to free up the specified metadata object. A log collection unit 65 collects information on which part of the allocation management data 61*a* was modified by the metadata allocation unit 63 or metadata deallocation unit 64. A log buffer 66 temporarily holds log records collected by the log collection unit 65.

The above data processing system will operate as follows. When a transaction 62 requests a free metadata object, the metadata allocation unit 63 chooses an available metadata object from among those managed in the allocation management data 61*a*. This object is allocated to the transaction 62, and its corresponding portion of the allocation management data 61*a* is updated to indicate the "in-use" state. On the other hand, when the transaction 62 requests the deallocation of a specific metadata object, the metadata allocation unit 63 updates the corresponding portion of the allocation management data 61*a* to show that the specified metadata object is now free. Each time the allocation management data 61*a* is updated, the log collection unit 65 extracts information about which part has been updated, and supplies the log buffer 66 with this information as a new log record.

It should be noted that the proposed logging system only records the location of each resource that was allocated or deallocated, rather than taking a snapshot of the entire bitmap, i.e., a copy of the allocation management data that manages the allocation of resources. Accordingly, each collected record only describes a single resource allocated or deallocated to/from a single transaction; in other words, it does not contain the information about any other resources or transactions. Besides consuming less amount of memory or other storage devices, this proposed method prevents the allocation management data from falling into an inconsistent state as a result of replaying logged operations.

Figure 7:
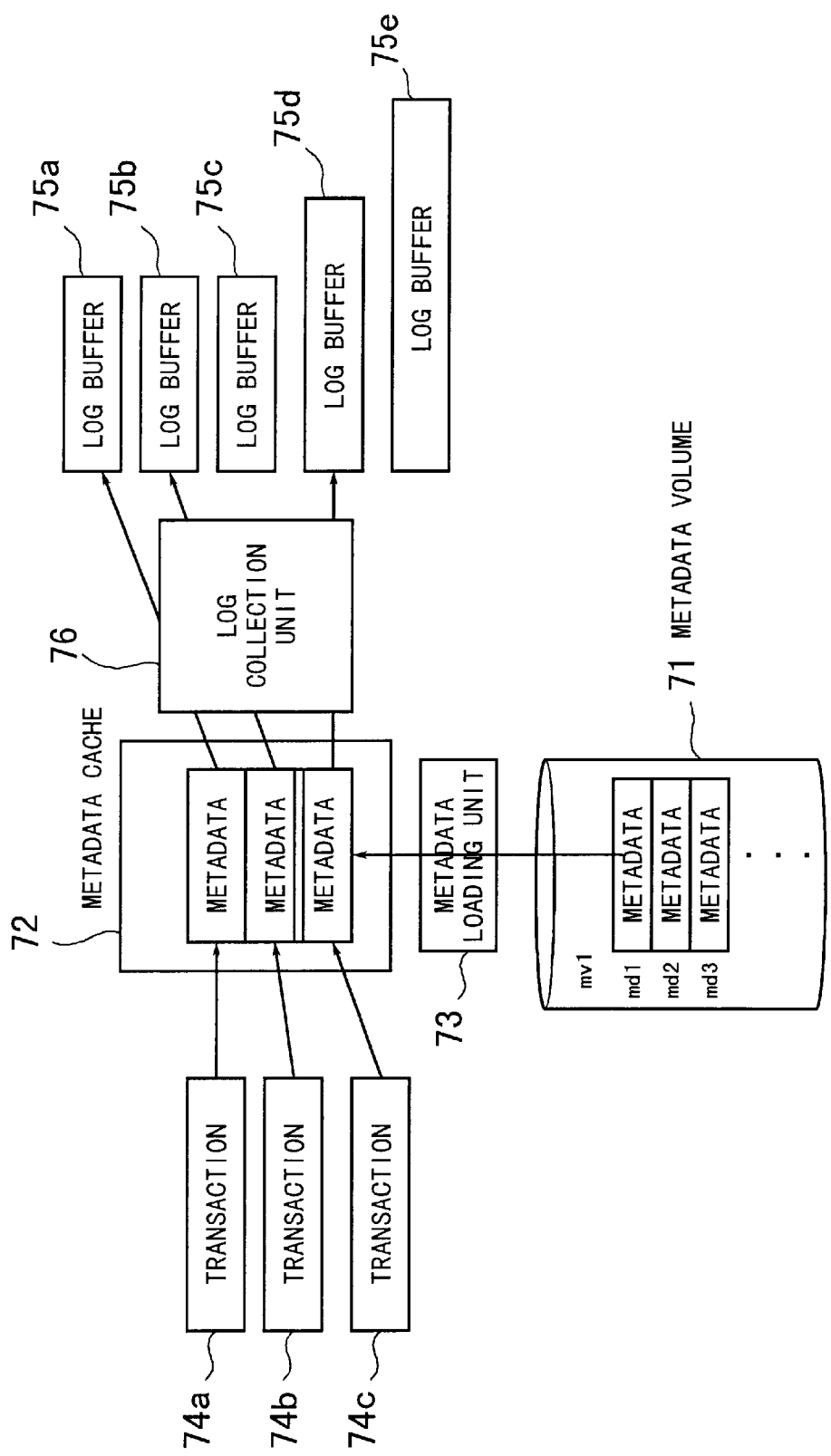
FIG. 7 is a conceptual view of a seventh aspect of the present invention.

Referring to FIG. 7, the concept of a seventh aspect of the present invention is shown. According to this seventh aspect of the invention, the logging system is equipped with a plurality of log buffers to enhance the independence of individual transactions from each other. To this end, the proposed system comprises several elements that function as follows.

The system has a metadata volume 71, a secondary storage unit storing metadata objects describing computer files. A metadata cache 72 is provided as part of the computer's main memory which holds a copy of metadata objects from the metadata volume 71. To fill this metadata cache 72, a metadata loading unit 73 loads metadata objects from the metadata volume 71, when a specific transaction demands them. Actually, a plurality of transactions 74*a* to 74*c* may make access to the metadata cache 72 to update metadata objects being held therein. A plurality of log buffers 75*a* to 75*e*, which may not be uniform in size, hold log records separately for each transaction. A log collection unit 76 records what modifications have been applied to metadata objects in the metadata cache 72. It transfers the collected log record of a specific transaction to one of the log buffer 75*a* which is suitable for that transaction in terms of log data size.

The data processing system configured as above will operate as follows. Assume here that concurrent transactions 74*a* to 74*c* are attempting to update metadata objects stored in the metadata volume 71. The metadata loading unit 73 then reads out the requested metadata objects and loads them to the metadata cache 72, thus allowing the transactions 74*a* to 74*c* to update them. The log collection unit 76 captures these updating operations, and the resultant log records are distributed to different log buffers 75*a* to 75*e* depending on which transaction they are derived from.

Log buffers are assigned dynamically, according to the expected total amount of log records to be produced in the course of each individual transaction. Further, the buffer assignment may vary even in the middle of a transaction. That is, the logging system allocates at first an adequate log buffer to a specific transaction, estimating the log data size from the intent of the transaction. If the buffer space becomes tight, the logging system moves the current contents to a larger log buffer to continue the logging operation.

As described above, the proposed logging system subdivides its log cache area into a plurality of log buffers, so that the behavior of individual transactions will be recorded independently of each other. Further, the proposed system provides log buffers of various sizes to fit different types of transactions, efficiently utilizing the limited memory space.

Figure 8:
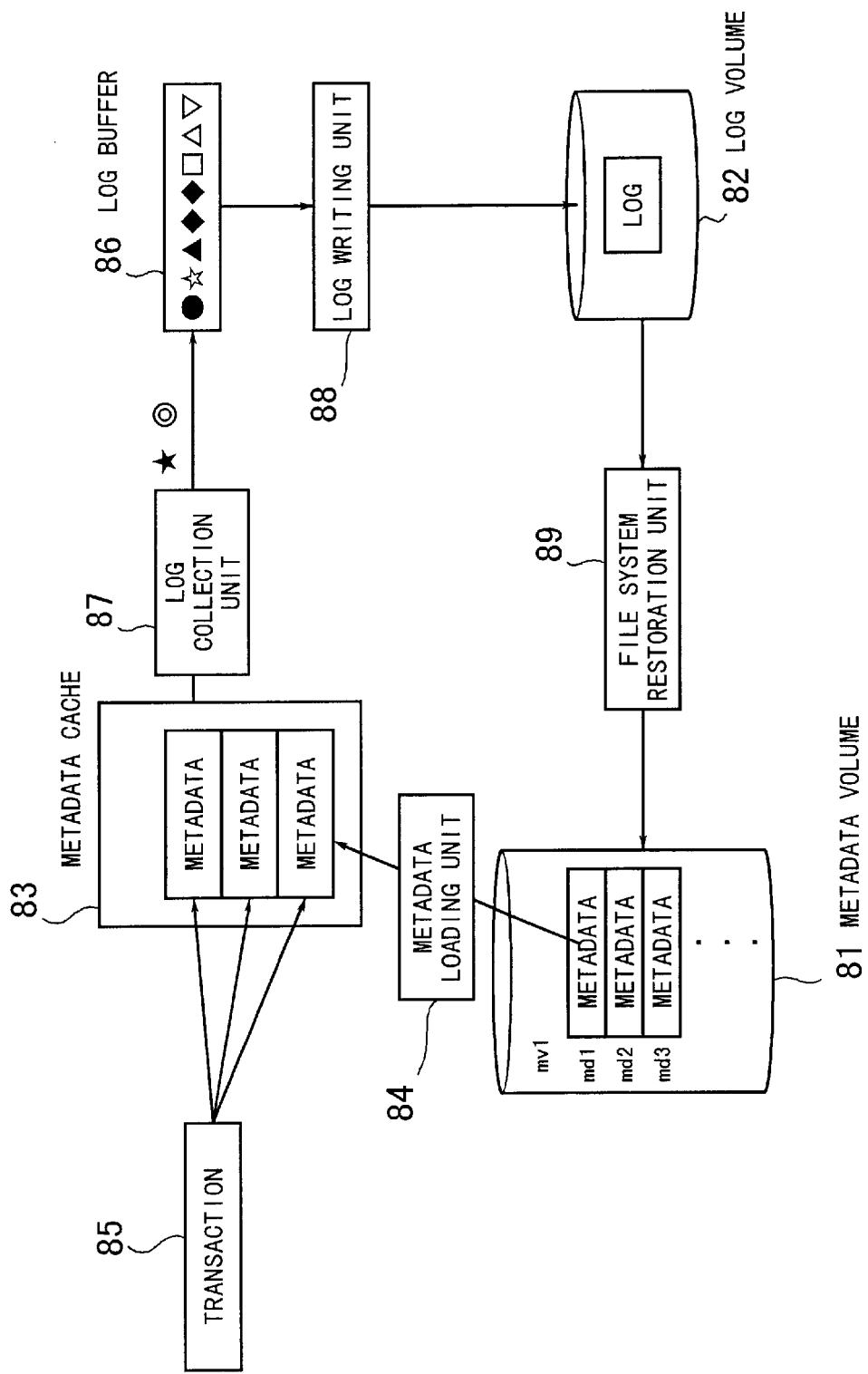
FIG. 8 is a conceptual view of an eighth aspect of the present invention.

Referring next to FIG. 8, the concept of an eighth aspect of the present invention will be shown. According to this eighth aspect of the invention, the logging system produces an interim log block by writing out the contents of a log buffer when it is overwhelmed by a number of log entries being produced by a transaction. The proposed system comprises the following elements.

A metadata volume 81 is a secondary storage unit which stores metadata objects describing computer files. Every modification made to those metadata objects are recorded in a log file and stored in a log volume 82, which is another secondary storage unit employed for this special purpose. A metadata cache 83 sits on the main memory which holds a copy of metadata objects from the metadata volume 81. A metadata loading unit 84 loads such a copy from the metadata volume 81, when a specific metadata object accessed by a transaction 85 is not found in the metadata cache 83. The transaction 85 may make access to the metadata cache 83 to update metadata objects being held therein. A log buffer 86 holds log records separately for each transaction. A log collection unit 87 records what modifications have been applied to metadata objects in the metadata cache 72, and sends such log records to the log buffer 86. A log writing unit 88 transfers log records from the log buffer 86 to the log volume 82 when the transaction 85 is finished. In addition, the log writing unit 88 massages the data in the log buffer 86 to create an interim log block, when the log buffer 86 is overwhelmed by the log records created by the transaction 85. This interim log block is written into the log volume 82 even before the transaction 85 is finished, thus restoring free buffer space. Further, the log writing unit 88 has a function to record, as part of the interim log block, execution parameters related to the transaction 85. A file system restoration unit 89 restores the file system when it receives a file system restoration request, by using relevant log records read out of the log volume 82 in order to correct inconsistencies found in the metadata volume 81. If an interim log block of a certain transaction is encountered during the restoration, the file system restoration unit 89 reruns the transaction using parameters extracted from the interim log block.

The above data processing system will operate as follows. The transaction 85 is now attempting to update metadata objects stored in the metadata volume 81. The metadata loading unit 84 then reads out the requested metadata objects and loads them to the metadata cache 83. Each time the transaction 85 makes an update, the log collection unit 87 creates a record of the updated metadata object. In this way, the log records related to the transaction 85 are accumulated in the log buffer 86. When the log buffer 86 is about to overflow, or when the transaction 85 is finished, the log writing unit 88 transfers the collected log records from the log buffer 86 to the log volume 82. In the former case, the log writing unit 88 massages the data in the log buffer 86 to create an interim log block and writes it into the log volume 82. When a file system restoration request is issued as a result of an abnormal system shutdown, the file system restoration unit 89 resolves the inconsistencies produced in metadata objects in the metadata volume 81 by replaying relevant log records retrieved from the log volume 82. In addition to this, the file system restoration unit 89 reruns the last transaction which was interrupted after its interim log block was saved.

The above-described feature of the invention helps the system to deal with such active transactions that cause many updates to metadata objects. After an abnormal shutdown occurred in the middle of a transaction of this kind, the system replays the log to reach that middle point and then reruns the unfinished transaction. The system can bring itself up to the state at which the last transaction is completed.

Figure 9:
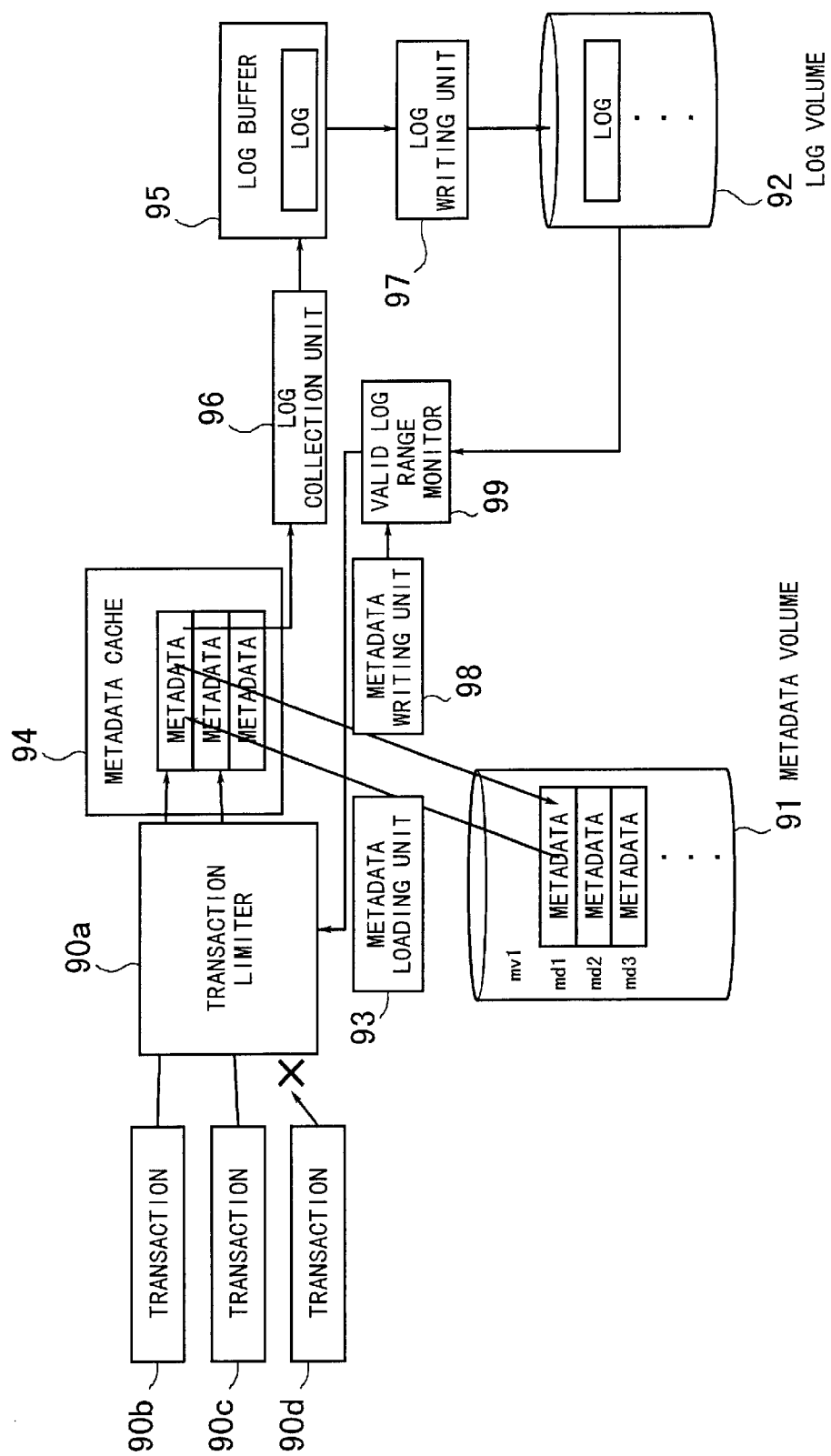
FIG. 9 is a conceptual view of a ninth aspect of the present invention.

Referring now to FIG. 9, the concept of a ninth aspect of the present invention is shown. According to this ninth aspect of the invention, the data processing system restricts the acceptance of transactions under predetermined conditions, thereby preventing the system from exhaustion of storage resources such as log cache memory. To implement this function, the proposed system comprises several elements described below.

The system has a metadata volume 91, which is a secondary storage unit storing metadata objects describing computer files. Every modification made to those metadata objects are recorded in a log file and stored in a log volume 92, which is another secondary storage unit employed for this special purpose. A metadata cache 94 is located on the main memory which holds a copy of metadata objects from the metadata volume 91. To fill this metadata cache 94, a metadata loading unit 93 reads out metadata object from the metadata volume 91, when they are demanded. A plurality of concurrent transactions 90*b* to 90*d* attempt to access the metadata cache 94 to update metadata objects being held therein. In response to their access requests, a transaction limiter 90*a* decides whether to accept or deny those requests, based on the current status of the logging system. The criteria for this decision may include, for instance, how much the log volume is occupied by valid log records. That is, the transaction limiter 90*a* would not accept any new transactions 90*b* to 90*d*, when a valid log range monitor 99 indicates that the occupancy of valid log records in the log volume exceeds a predetermined threshold.

The system further employs a log collection unit 96 to collect log information as to what modifications have been made to metadata objects in the metadata cache 94. A log buffer 95 holds such log records collected by the log collection unit 96, and a log writing unit 97 transfers them from the log buffer 95 to the log volume 92, as needed. A metadata writing unit 98, on the other hand, transfers the updated metadata objects from the metadata cache 94 back to the metadata volume 91. The valid log range monitor 99 observes this write back operation to determine which updates have been reflected in the metadata volume 11. If there are unfinished updates, the valid log range monitor 99 regards their corresponding log records as "valid log records."

The above data processing system will operate as follows. When an access request is received from either of the transactions 90*b* to 90*d*, the transaction limiter 90*a* decides whether to accept this request, on the basis of certain prescribed criteria. For example, it observes how much the valid log records share the log volume 92. If this occupancy ratio is not less than a predetermined threshold, the transaction limiter 90*a* will suspend the acceptance of the transaction, not to increase the ratio. Actually, this ratio gradually decreases as the metadata writing unit 98 writes updated metadata objects back to the metadata volume 91. The transaction limiter 90*a* then resumes accepting new transactions. In this way, the transaction limiter 90*a* tries to maintain the free space in the metadata volume 91 to a certain level, thus preventing the system from facing the risk of hang-up.

The above sections have outlined eight distinctive aspects of the present invention. The following sections will now present more specific embodiments of the present invention, with reference to FIGS. 10 and 11.

Figure 10:
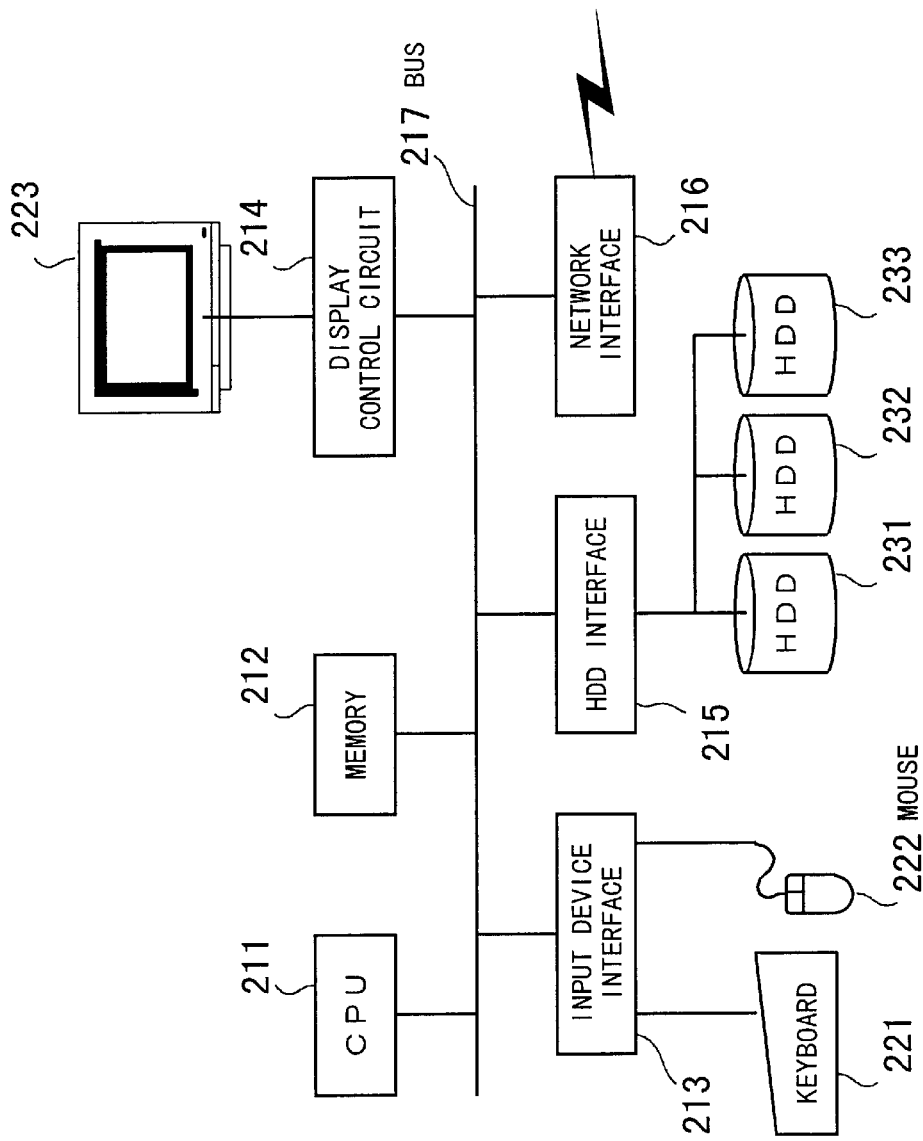
FIG. 10 is a hardware block diagram of a data processing system in which the present invention is embodied.

Referring first to FIG. 10, the invention is explained from the perspective of preferred hardware platforms. FIG. 10 is a block diagram of a data processing system in which the present invention is to be implemented. This data processing system has a central processing unit (CPU) 211 which plays a central role in providing intended services. That is, the CPU 211 carries out various data processing tasks based on a software program loaded on a memory 212, while controlling peripheral device interfaces on a bus 217. It also uses the memory 212 as temporary storage for data necessary for the execution of application programs.

The peripheral device interfaces provided in the system are: an input device interface 213, a display control circuit 214, a hard disk drive (HDD) interface 215, and a network interface 216. The input device interface 213 receives signals from a keyboard 221 and a mouse 222 and supply them to the CPU 211. The display controller 214 produces screen images according to drawing commands and picture data sent from the CPU 211, while supplying a monitor unit 223 with a video signal to display the produced images on its screen. The HDD interface 215 controls data reading and writing operations from/to a plurality of hard disk drives 231 to 233. The network interface 216 allows the CPU 211 to make access to a local area network (LAN) to transport data packets to/from other computers on the LAN.

The hard disk drives 231 to 233 store a variety of program and data files, together with metadata for file management and transaction log information. Most proposed log collecting functions are actually implemented as part of operating system programs, which are also stored in the hard disk drives 231 to 233. The CPU 211 executes such operating system programs on its main memory 212, providing the intended features according to the present invention.

Figure 11:
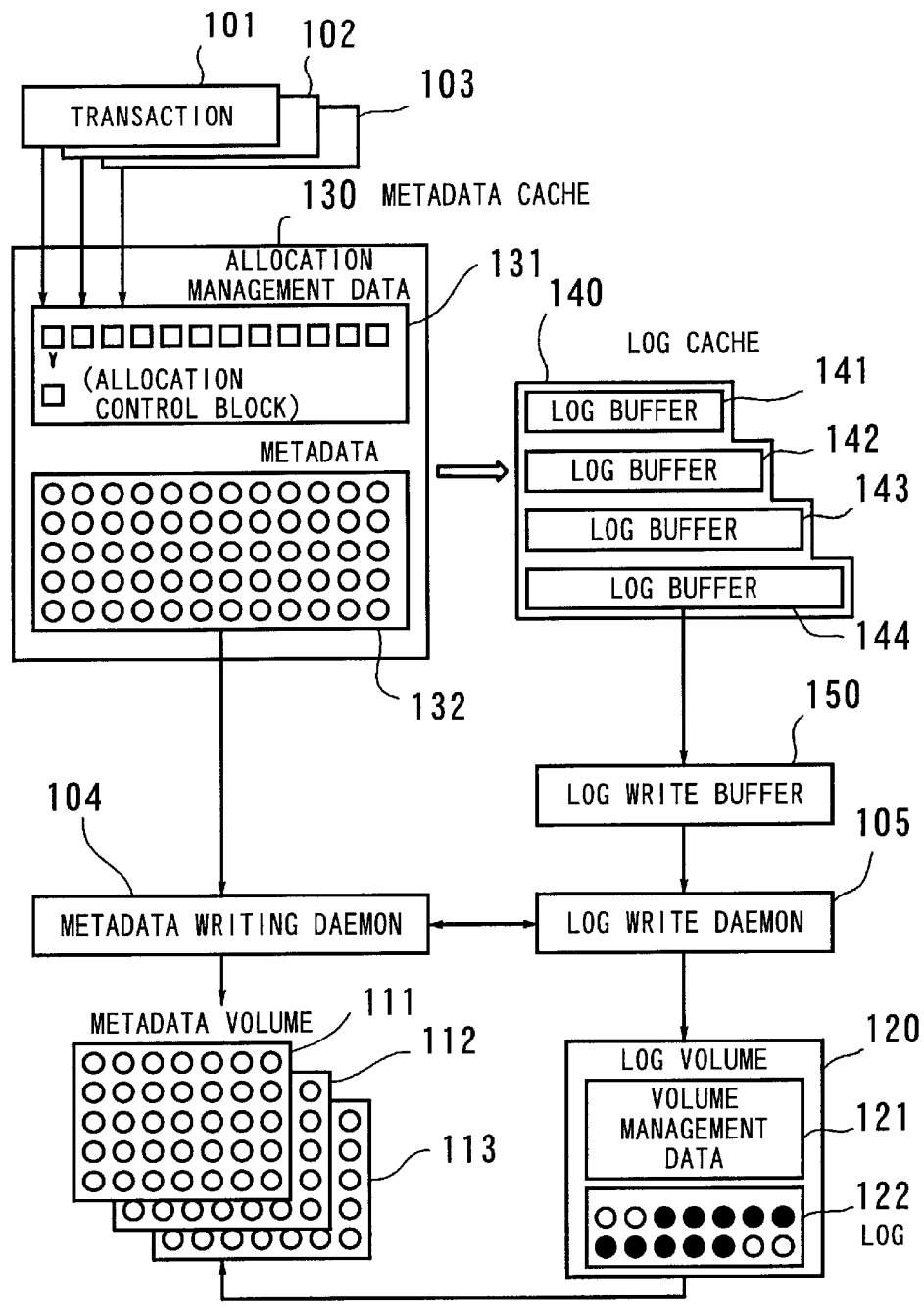
FIG. 11 is a block diagram of the proposed logging system which operates on a file system.

Referring next to FIG. 11, the proposed logging system operating on a file system is shown. For the purpose of file management, there are a plurality of metadata volumes 111 to 113 storing metadata objects. Here, a metadata object contains information necessary to manage each file, including location, size, timestamps, access permission, and other properties. A log volume 120 is a secondary storage device used to store log records 122, together with volume management data 121. A metadata cache 130 is a memory area for manipulating metadata, which contains metadata objects 132 in process and allocation management data 131 associated with them. A log cache 140 comprises a plurality of log buffers 141 to 144, whose sizes are not necessarily uniform. Those log buffers 141 to 144 store the log records, i.e., the replicas of metadata objects updated in the metadata cache 130.

In addition to the above log cache 140, there is provided a log write buffer 150 which receives log records from the log buffers 141 to 144 when each transaction is done. Referring to the example of FIG. 11, three transactions 101 to 103 are running in parallel, which have been invoked from one file system operation. There are two daemons called a metadata writing daemon 104 and log write daemon 105, which undertake disk I/O tasks. The log write daemon 105 is responsible for writing log records to the log volume 120. Upon completion of this log write operation, the metadata writing daemon 104 executes a write operation to the metadata volumes 111 to 113 to save metadata objects corresponding to the log records that have just been written.

Referring now to FIGS. 12 to 23, twelve distinctive features of the invention will be explained.

A first distinctive feature of the invention is that the logging system includes the identifier (ID) of a metadata volume as part of a metadata descriptor, i.e., a set of data for managing each metadata object. The use of metadata volume IDs facilitates the system to support a large scale file system. Referring again to FIG. 11, the system employs a plurality of secondary storage devices to provide multiple metadata volumes 111 to 113. Although not shown in FIG. 11, metadata descriptors containing volume IDs are located in the metadata cache 130, permitting the system to figure out which metadata volume is the origin of a specific metadata object in the multi-volume environment.

Figure 12:
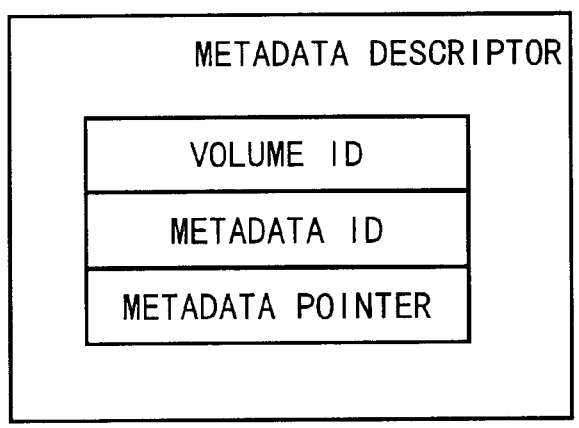
FIG. 12 is a diagram which shows a metadata descriptor.

FIG. 12 shows a metadata descriptor of a metadata object, which has three data fields named "Volume ID," "Metadata ID," and "Metadata Pointer." The volume ID field contains the identifier of a metadata volume storing the metadata object. The metadata ID field holds the identifier of the metadata object itself, which must be uniquely assigned at least within its home metadata volume. In other words, the location of each metadata object is given by a device ID by which the system identifies a volume, in combination with a value representing an offset in the volume. Such location indicators are tied with each instance of metadata for management purposes. Referring again to FIG. 12, the third field "Metadata Pointer" directly points at a place where the metadata object actually resides. When a transaction has updated a specific metadata object having such a descriptor, the operating system creates a log record representing the updated metadata object and saves it into a log buffer, along with the contents of the metadata descriptor.

Figure 13:
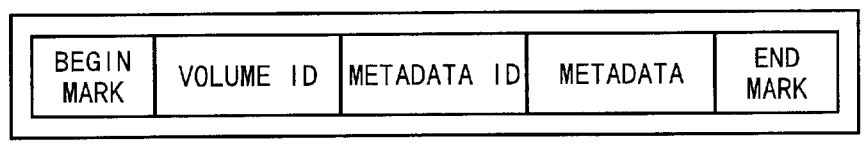
FIG. 13 is a diagram which shows a typical log record format.

Referring next to FIG. 13, a typical log record format is shown. To record metadata updates, each log comprises the following data fields: "BEGIN Mark," "Volume ID," "Metadata ID," "Metadata Record," and "END Mark." Those field values will be used in file system recovery. When a record of a specific metadata object is given, the operating system has to identify its destination, i.e., the home volume of the metadata object. Because the answer is immediately found in the log record itself, the operating system can accomplish the tasks more quickly than in conventional systems, in which volumes should be determined from metadata IDs. As such, the proposed logging system works effectively even in a large-scale file system.

A second distinctive feature of the present invention is that each metadata object modified in the metadata cache 130 has a link pointer to chain itself in an appropriate list structure. For example, a metadata write list is a linked list containing metadata entries that wait for write back operations. More specifically, when the logging system has saved a log record of a certain metadata object into the log volume 120, that metadata object is then chained in the metadata write list. The object should stay in this list until it is written back to its home metadata volume. More importantly, the metadata write list holds information about the location of a log record in the log volume 120, corresponding to each metadata object in the list. That is, tracing the metadata write list will yield a range of valid log records. Since this information is quite useful in restoring file systems after an abnormal shutdown, it is recorded as part of the log volume management data 121, which occupies a particular region of the log volume 120. With the valid log range information recorded as such, the operating system can selectively replay the log records, in the event that the file system should be restored after system failure. Note that it is not necessary for the system to search the entire log volume to determine which log records to use, and thus the system can recover more quickly than with conventional methods.

Most logging systems exploit a sequential access method to write log records to a hard disk, because it enables fast disk access with minimum head movement (i.e., with few seek operations). The system of the present invention, however, makes access to a particular region of the log volume in order to save valid log range information, when writing back metadata objects to metadata volumes, or when saving log records to the log volume. This disk access does cause seek actions to position the head on a specified track, meaning that the proposed system is unable to fully benefit from sequential disk access.

To avoid the above disadvantage, the logging system of the present invention is configured to write the valid log range information at predetermined intervals, rather than writing immediately after each metadata change.

Unfortunately, this configuration may introduce some errors, or uncertainty, to the valid log range suggested by the recorded information. However, the system can compensate for the uncertainty with a minimum penalty, when it restores the file system. The next section will focus on this issue.

Figure 14:
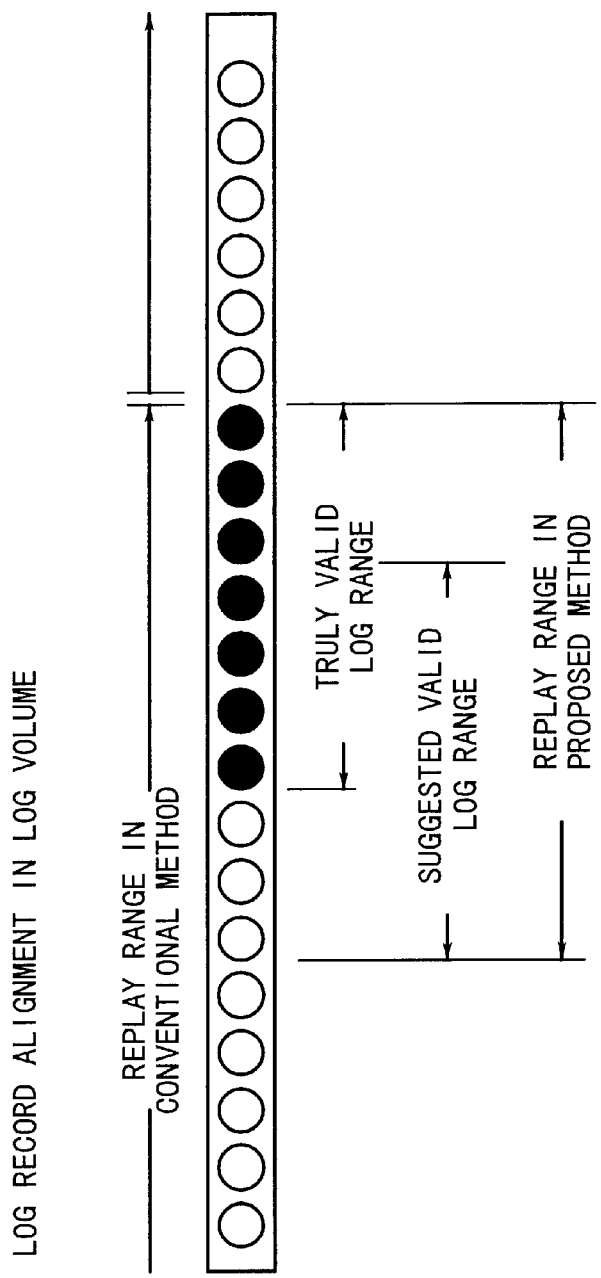
FIG. 14 is a diagram which explains the concept of valid log range.

FIG. 14 explains the valid range of log records. Small black and white circles represent a series of log records stored in the log volume. More specifically, black circles denote log records of such metadata objects whose current states have not yet been reflected in the metadata volumes. These log records are essential to file system recovery. On the other hand, white circles represent log records of such metadata objects that are consistent with those in the metadata volumes, meaning that they are not essential information.

Conventionally, the file system is recovered by: (1) searching the entire log volume, with reference to the sequence number attached to each log record, (2) identifying the oldest log record, and (3) replaying all the recorded updates from the oldest one. That is, the conventional method uses every log record found in the log volume, regardless of whether it is essential or not. In contrast to this, the logging system according to the present invention offers valid log range information that indicates which part of the log volume is really necessary. As mentioned before, this information may include some errors, because it is a kind of "snapshot" of relationships between metadata volumes and log records. This snapshot shows a recent state of the log volume, but it may not always be the latest state in an exact sense. After the snapshot was taken, some metadata objects might have been written back to their metadata volumes, or some log records might have been saved into the log volume. For this reason, the truly valid log range is slightly shifted to the right-hand side of FIG. 14, compared to the one suggested by the valid log range information stored in the log volume. In the file system restoration subsequent to a system crash, the operating system starts to replay the logged updates from the beginning of the suggested valid log range. Although this certainly includes some unnecessary steps and thus consumes some extra time, the resulting inconvenience is relatively minor. To find the true tail end of the valid log range, the operating system also has to make a partial search from the endpoint suggested by the valid log range information. This task is not a big problem since the search range is limited by the interval of log write operations.

A third distinctive feature of the present invention is that the logging system has a large counter to produce a long series of sequence numbers which are given to every log record at the end of a transaction. Preferably, the range of the sequence numbers is determined such that the logging system can continue to supply valid numbers throughout the computer system's lifetime and beyond. Since the sequence number is defined as a variable in the logging system software, here arises a question of what data type should be assigned to the sequence number variable. The present invention answers this question as described in the next paragraph.

Suppose, for example, that the computer system uses its internal calendar clock which represents the year by four decimal digits. Theoretically, this computer system can survive until the year of 9999. Then its logging system should be designed to choose a data type having enough digits to generate monotonously increasing sequence numbers for at least 9999 years. Since such a sequence number variable can hardly return to zero due to overflow, it is no longer necessary for the logging system to reinitialize the entire log volume to zeros during its lifetime. In most practical implementations, a 64-bit long integer variable will meet the above requirement; it is expected to work for about 40,000 years. The proposed logging system adds such sequence numbers to data for file system management, transaction logs, and valid log range information, when they are saved into the log volume. With a sufficient number of digits assigned, the variable will generate an incremental sequence number each time a new transaction occurs during normal operation, without overflow.

The above-described sequence numbers are also recorded as part of an object called the super block, a piece of information describing the entire file system. The system saves the last sequence number into this super block when unmounting a file system, and it resumes logging from the next sequence number when the file system is mounted again. This mechanism ensures that the stored log records have their sequence numbers correctly aligned in ascending order, thus preventing a new valid log record from being confused with an old record during the file system restoration process.

Because the orderliness of the sequence numbers is guaranteed, the present invention eliminates the need for initializing the log volume when restoring the file system, while permitting the logging system to assign a sequence number to each log record in a simple and consistent manner. Because the present log volume can be reused without initialization, the time required for file system recovery is greatly reduced, meaning that the computer system can fully benefit from its integral logging mechanism.

A fourth distinctive feature of the present invention is that the logging system uses a list structure to manage a certain class of metadata objects which can be modified two or more times during a single transaction. They include such metadata objects that manage storage resource allocation, for example. This kind of metadata objects are not copied to log buffers while the transaction is in progress; instead, they are simply chained in a list structure called a "transaction list." When the transaction is completed, the logging system scans the list structure to collect the final state of every metadata object chained in the list. Because it produces no records until the transaction is finished, this method compresses the size of log records, contributing to faster file system recovery.

The above feature is actually implemented in a cache manager which controls metadata in the metadata cache. More specifically, each metadata object in the metadata cache has a prescribed data structure, which includes a link pointer that associates the object with the transaction list. When a certain transaction is initiated, the logging system determines whether the transaction will cause many updates. If it is known that the update occurs just once, the logging system immediately transfers a copy of the metadata to the log buffer. If more update operations are expected to occur, the logging system uses the link pointer to chain the metadata object in the transaction list.

The logging system determines the behavior of a transaction by checking its type code. Consider, for example, such a transaction that manages free data areas in a certain storage device. This kind of transactions are likely to repeat many update operations to specific objects. Therefore, the logging system enters such objects to the transaction list, instead of producing a log record for each of them. At the end of the transaction, the system copies the final state of relevant metadata objects to the log buffer, tracing the transaction list. After all, only one log record is saved for each metadata object, regardless of how many times it has been updated. (What has been referred to here as the transaction list will be described as BTF and BTA lists in a later section.)

Figure 15:
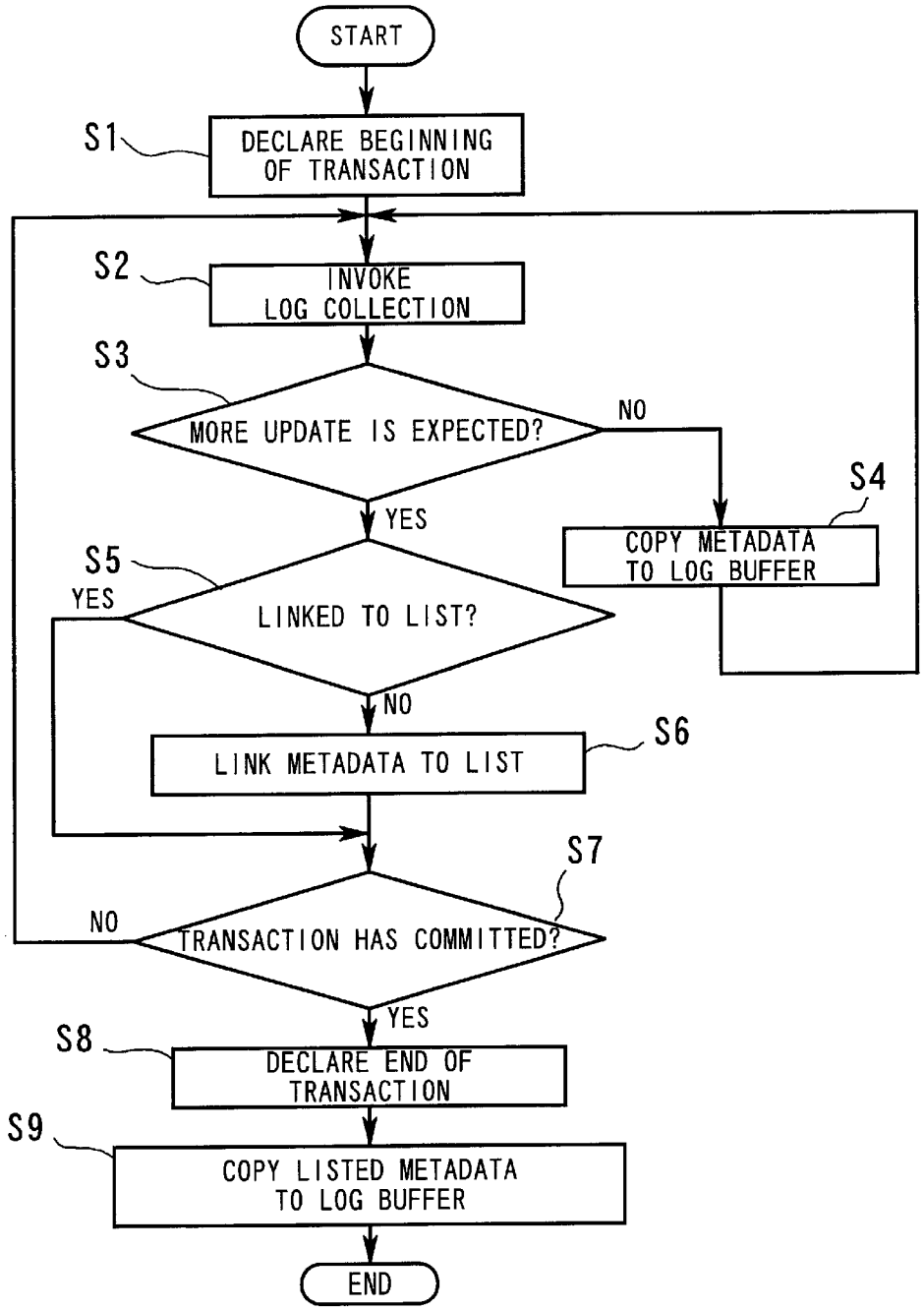
FIG. 15 is a flowchart of a log collection process.

FIG. 15 is a flowchart of a log collection process. This process is performed by the CPU under the control of, or as part of, the operating system. The process comprises the following steps.

(S1) The system declares the beginning of a transaction.
(S2) In response to an update operation made to a metadata object, the system issues a log collection request.
(S3) It is determined whether the same metadata object may be updated again. If more updates are expected to occur, the process proceeds to step S5. Otherwise, the process goes to step S4.
(S4) The system copies the metadata object to the log buffer, and returns to step S2.
(S5) It is tested whether the metadata object is linked to the transaction list. If linked, the process skips to step S7. Otherwise, the process advances to step S6.
(S6) The system creates a link from the metadata object to the transaction list.
(S7) It is tested whether the transaction is about to end. If so, the process advances to step S8, and otherwise, it returns to step S2.
(S8) The system declares the end of the transaction.
(S9) The metadata objects involved in the above steps have been updated, but the system has not yet completed the logging of some of those objects. Tracing the transaction list, the system now copies relevant metadata objects to the log buffer.

In this way, the logging system saves log records representing only the final state of metadata objects manipulated by a transaction.

A fifth distinctive feature of the present invention is that the data processing system manages the allocation of metadata volume resources on the basis of allocation management data, together with its partial copy. Using this partial copy for resource allocation is a distinct feature of the present invention. The allocation management data may be implemented in the form of a bitmap. The next section provides a more specific example of allocation management using bitmaps.

Figure 16:
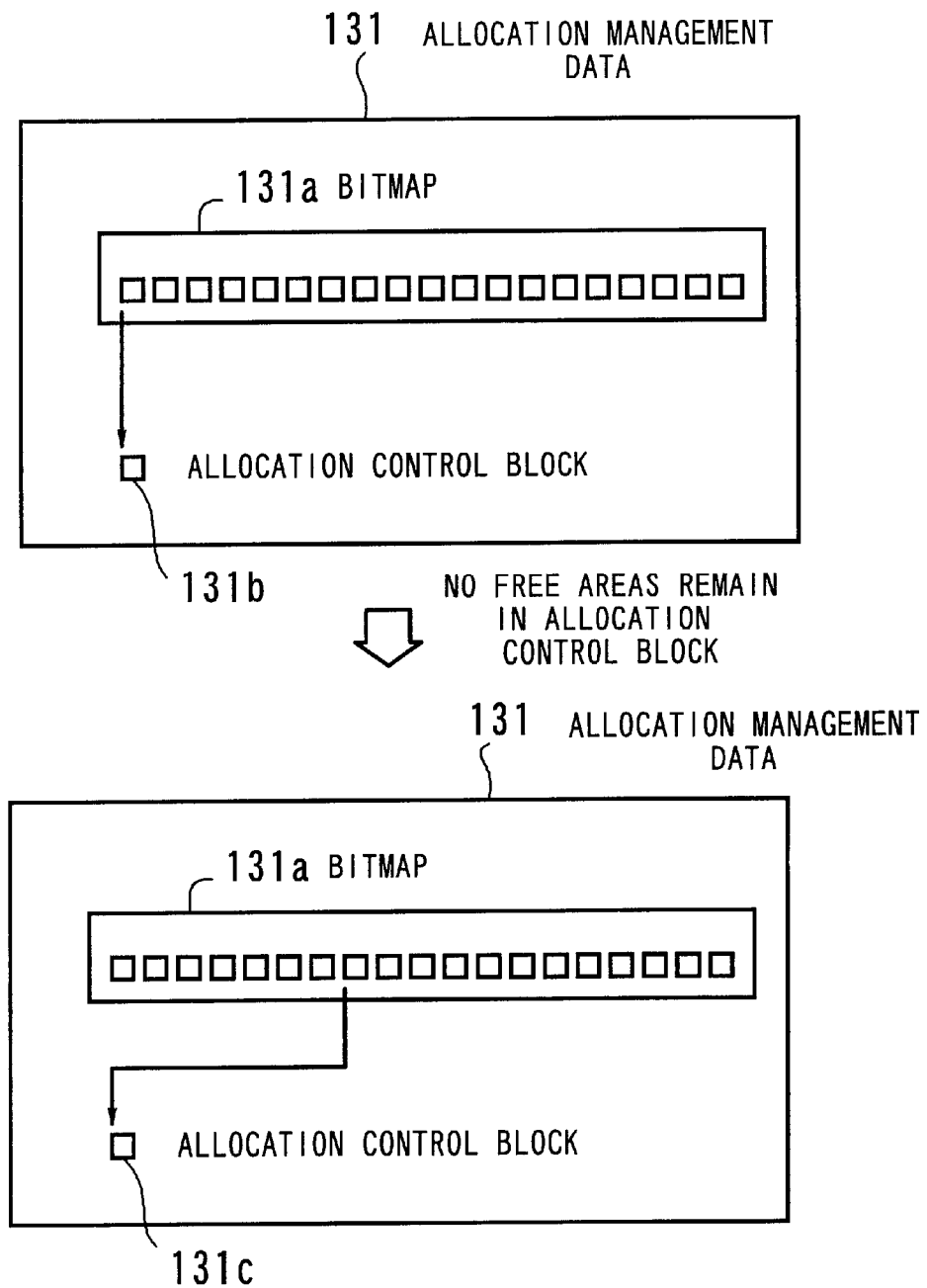
FIG. 16 is a diagram which shows a mechanism for allocating metadata volume resources.
Figure 17:
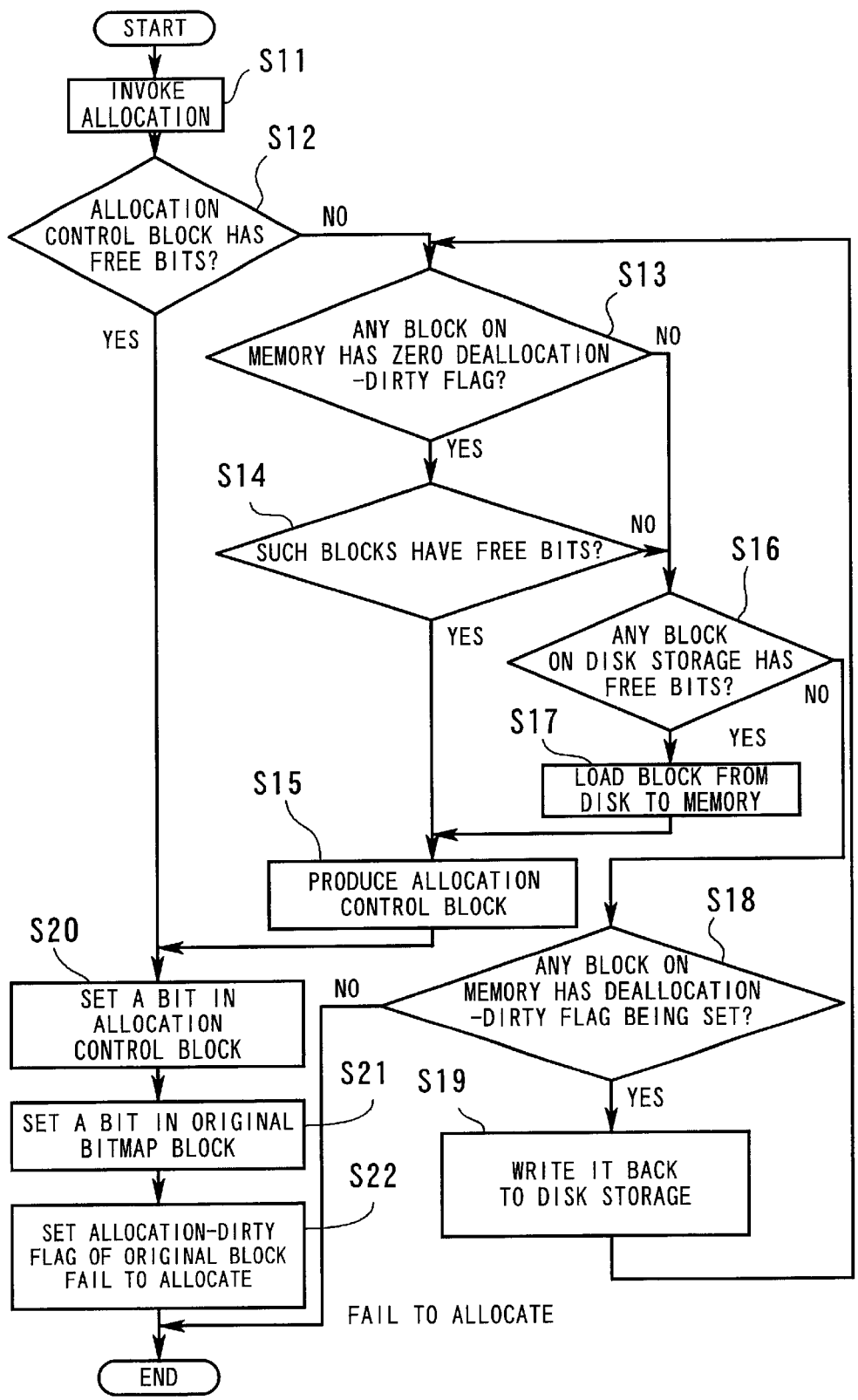
FIG. 17 is a flowchart which shows an allocation process using a bitmap.

FIG. 16 shows how the system allocates metadata volume resources. Allocation management data 131 includes a large bitmap 131a which is used to control the allocation of individual metadata objects stored in a metadata volume. This bitmap 131a is subdivided into a plurality of smaller blocks, each of which contains a plurality of bits corresponding to individual metadata objects. That is, each bit indicates whether the corresponding metadata object is free ("0") or allocated ("1"). In accordance with certain selection criteria (described later), the system chooses one of the subdivided bitmap blocks and dedicates its replica to the allocation of metadata objects. This block is referred to as an allocation control block 131b.

When a transaction raises an allocation request, the system invokes a search of the allocation control block 131b to find free areas, which are represented as zero-valued bits, by using normal bitmap manipulation techniques. If a free area (i.e., zero bit) is successfully found, the search function returns the relevant bit position. The system then flips the bit to one, both in the allocation control block 131b and its original portion of the bitmap 131a. If the above search has failed, the system chooses another block of the bitmap 131a and duplicates the block as a new allocation control block 131c, as shown in the lower half of FIG. 16.

The implementation of the above-described feature will actually be more complex, since it has to allow for data caching mechanisms. Each bitmap block resides in the disk storage and can be cached on the memory under the control of a cache manager integrated in the operating system. Referring now to a flowchart of FIG. 17, a resource allocation process using bitmap blocks is shown. This process is executed by the operating system, according to the following steps.

(S11) In response to a request from a transaction, the system invokes an allocation process.
(S12) The system determines whether the allocation control block indicates any free area. If a free area is available, the process proceeds to step S20. Otherwise, the process advances to step S13.
(S13) The system searches all the bitmap blocks on the memory (i.e., metadata cache 130 shown in FIG. 11) to find bitmap blocks whose Deallocation-Dirty flag is zero. If such bitmap blocks are found, the process advances to step S14. Otherwise, the process proceeds to step S16.

Here, the Deallocation-Dirty flag, if set to one, indicates that one or more deallocating operations have been done to the bitmap block. That is, the state "Dirty" implies that information on the memory has been modified, but the modification has not yet been reflected in the disk storage.

(S14) Examining the bitmap blocks with a zero Deallocation-Dirty flag, the system attempts to find a block that has free bits. If such a bitmap block is found, the process advances to step S15. If not found, the process branches to step S16.
(S15) The system replicates the bitmap block found at step S14, thereby producing a new allocation control block. Now that free bits are available, the process proceeds to step S20.
(S16) Since free bits on the memory are exhausted, the system now searches bitmap blocks stored on the disk storage (i.e., metadata volumes 111 to 113 in FIG. 11), thereby determining whether any of them have free bits. If a bitmap block with free bits is found, the process advances to step S17. Otherwise, the process proceeds to step S18.
(S17) The system loads the bitmap block from the disk storage (metadata volumes 111 to 113) to the memory (metadata cache 130). The process now proceeds to step S15.
(S18) The system searches again the memory (metadata cache 130) to find any bitmap block whose Deallocation-Dirty flag is set to one. If such a bitmap block is found, the process advances to step S19. Otherwise, the system exits from the present process, failing to allocate a metadata object since no free bit is available.
(S19) Now that an appropriate bitmap block with a Deallocation-Dirty flag being set is cached on the memory, the system writes it back to the disk storage, thus rendering the block "Clean." As opposed to "Dirty" state, "Clean" state of a bitmap block denotes the block has not experienced any allocation or deallocation operations. The process then proceeds to step S13.
(S20) Now that a free bit is found in the allocation control block, the system sets this bit to one.
(S21) The system further sets the same bit in the original bitmap block from which the current allocation control block is produced.
(S22) The system sets Allocation-Dirty flag of the original bitmap block and then exits from the present process, successfully allocating a metadata object to the requesting transaction. This Allocation-Dirty flag, when set to one, means that one or more allocating operations have been done to the bitmap block.

As seen from the above explanation, the flags called "Allocation-Dirty" and "Deallocation-Dirty" are introduced to control caching of bitmap blocks. When either of these flags is set, the corresponding bitmap blocks on the memory must have new information, meaning that they have to be recorded by the logging system. The flags further indicate that those blocks has to be written back to the disk storage. When the metadata volume is updated with such new information, the flags are reset to zeros, or "Clean" state.

In connection with the above-described allocation process, the operating system executes a deallocation process when freeing unnecessary resources. This process manipulates the bitmap blocks used in the allocation process, resetting a specific bit that corresponds to the resource to be freed. It should be noted that the resetting operation applies only to the original bitmap block, but not to the allocation control block even if it contains the bit.

Figure 18:
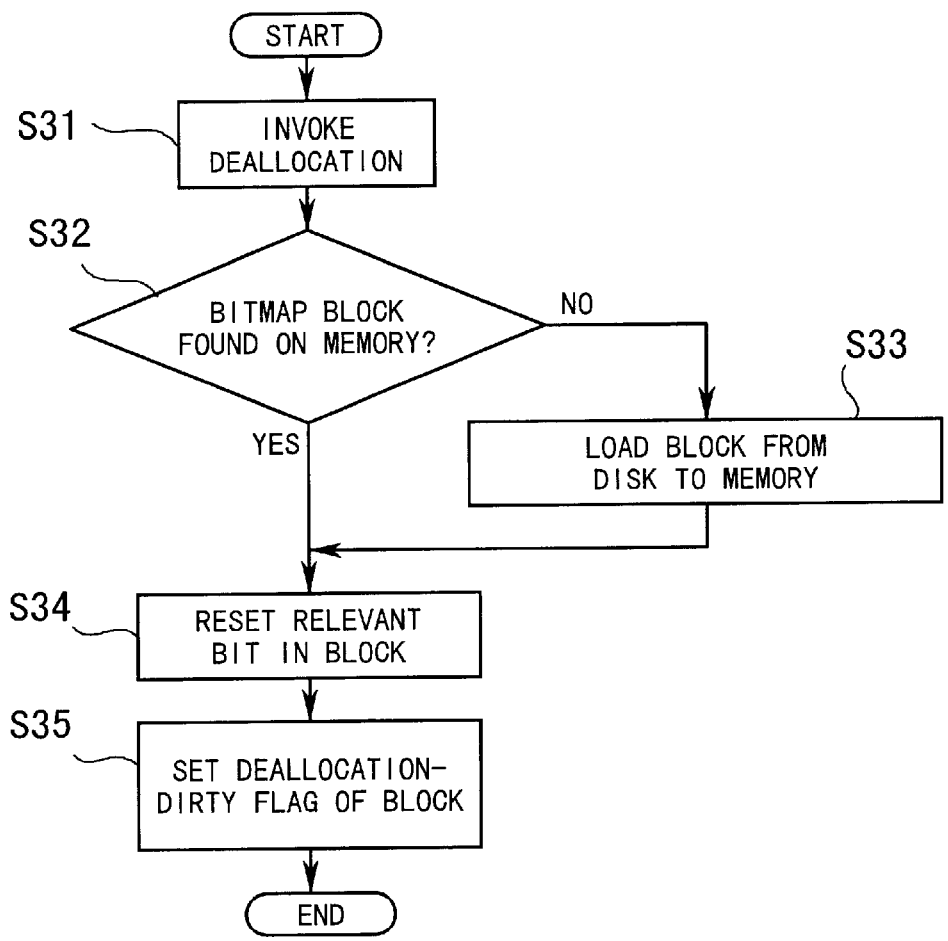
FIG. 18 is a flowchart which shows a deallocation process.

FIG. 18 is a flowchart which shows a deallocation process. The operating system performs this task according to the following steps.

(S31) In response to a request from a transaction, the system invokes a deallocation process.

(S32) The system searches the memory (metadata cache 130) to find a bitmap block including the target bit. If found, the process advances to step S34. If not found, the process proceeds to step S33.

(S33) The system loads the bitmap block from the disk storage (metadata volumes 111 to 113) to the memory (metadata cache 130). The process now proceeds to step S34.

(S34) The system resets the target bit in the bitmap block that is found at step S32 or loaded at step S33.

(S35) The system sets the Deallocation-Dirty flag of the bitmap block.

While the above allocation and deallocation processes are seemingly complicated tasks, the proposed mechanism prevents an area from being reallocated immediately after its release from another transaction. Even when a transaction is forced to finish in the middle of deallocation because of system failure, the proposed logging system ensures that the area of interest preserves its state just before the freeing operation takes place.

Figure 19:
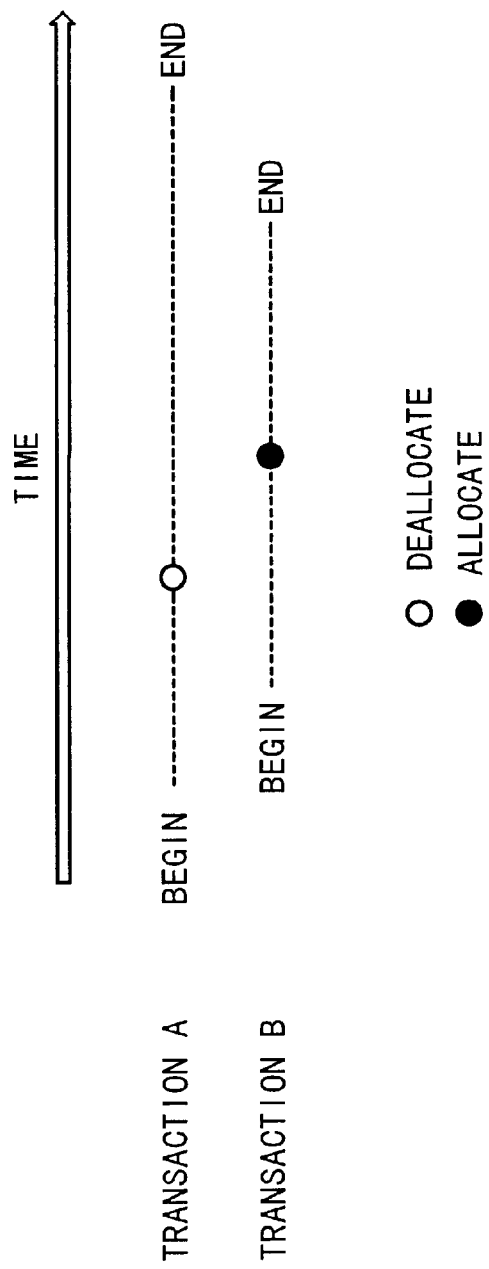
FIG. 19 is a diagram which shows two concurrent transactions requesting and releasing a resource.

Imagine the following scenario, for example. There are two transactions running simultaneously; transaction A is deallocating a resource, while transaction B is requesting a resource. Suppose that the transaction A started earlier than B, but ends later than B. FIG. 19 depicts this situation, where allocation and deallocation of storage resources are processed concurrently. In FIG. 19, the beginning and end of each transaction are indicated by the symbols "BEGIN" and "END," and the timings of deallocation and allocation operations are indicated by a white and black circles, respectively. As mentioned earlier, the situation of FIG. 19 is problematic in terms of consistency in resource sharing. Indeed, the illustrated transaction sequence is a typical scenario in which conventional logging systems would produce an erroneous state.

With the method according to the present invention, however, the transaction B hardly gets the area freed by the transaction A. If no other free resource is available, the relevant bitmap block is written back to the metadata volume and then subjected to the allocation process. For this reason, the system is free from such an inconsistent state where the same resource is allocated to two requesters, even if the log records for file system restoration include those representing updates that have not been reflected in the metadata volume.

In the process of file system restoration after failure, the log record of transaction A would be replayed later than that of transaction B. However, the area allocated to the transaction B would not be affected by any log record of the transaction A. This is because the log record of the transaction B contains no indication of the deallocation operation made by the transaction A.

A sixth distinctive feature of the present invention is that the logging system logs resource allocation and deallocation operations by recording the location of each specific resource that is assigned or freed (e.g., which bit was set or reset in the allocation map), instead of saving a copy of the allocation map at each moment. This feature supports logging of multiple concurrent transactions involving resource allocation and deallocation, without the need for serializing the transactions. Besides reducing the amount of log records to be collected, it is possible to reduce the frequency of data writing back operations to the metadata volume to reflect updates made by a plurality of transactions.

A seventh distinctive feature of the present invention is that the logging system divides its log cache into a plurality of log buffers of various sizes. This multiple log buffer configuration enhances the independence of individual transactions, as well as allowing more efficient use of limited memory resources. To make the above possible, every transaction should make a previous notice to the system, declaring its intention to update a certain metadata object(s). In response to this, the system allocates an appropriate log buffer having necessary and sufficient capacity to hold all log records to be produced, whose total amount is estimated from the type of the transaction. Using such various-sized log buffers, together with the technique described above as the sixth feature of the invention, the proposed system isolates transactions from each other so that the activities of each single transaction will be separately logged.

An eighth distinctive feature of the present invention, which is based on the above-noted seventh feature, is that the log buffer assignment is flexible, even allowing migration to a larger log buffer when the actual amount of log information is larger than expected. The amount of produced log records may vary, depending upon the circumstances surrounding each transaction process. The proposed logging system copes with the variation in a simple way, besides making efficient use of limited memory resources.

A ninth distinctive feature of the present invention is that the logging system produces and writes out an interim log block to the log volume when the log buffer is just going to overflow, while taking necessary measures for preventing any discrepancy from being introduced therefrom.

The logging system is equipped with a secondary cache memory called a log write buffer to reduce write data traffic toward the log volume. Log records of a finished transaction is transferred from the log buffer to the log write buffer. At appropriate times, those records are written to the log volume by an agent called the log write daemon 105 (FIG. 11). Here, the phrase "at appropriate times" basically means that writing operations take place at predetermined intervals. But this applies only when the log traffic is relatively low. Suppose that some concurrent transactions are making so frequent updates to metadata objects that even the largest log buffer is overwhelmed by the produced log records. The logging system is now required to forcefully invoke a log write operation. To keep the file system consistent even in such a situation, it will be necessary for the logging system to record the state of metadata objects at some midpoint, although that record does not include future updates (if any) to be made by the transaction in progress.

Besides allowing more efficient use of the limited memory space, the present invention proposes a way to preserve the integrity of a file system when it is recovered by using the stored log records including those written out at some midpoint within a transaction. Again, the collected log records temporarily stored in a log buffer should be transferred to the log volume. The log write daemon is programmed to make this transfer operation at predetermined intervals as long as the file system is not so heavily loaded, to minimize the I/O traffic between the log buffer and log volume. When the buffer space becomes too tight to accommodate all expected log records of an ongoing transaction, the logging system decides to write out the log records accumulated up to this point to the log. This interim log block should include information about unfinished operations. Think of, for example, a transaction which is going to append a file to another file. In this case, the logging system adds information about the file sizes and timestamps to the interim log block. The operating system can draw enough information from this interim log block, in nearly the same way as it handles other normal logs, making it possible to restore the file system to a desirable state through a relatively simple procedure.

Figure 20:
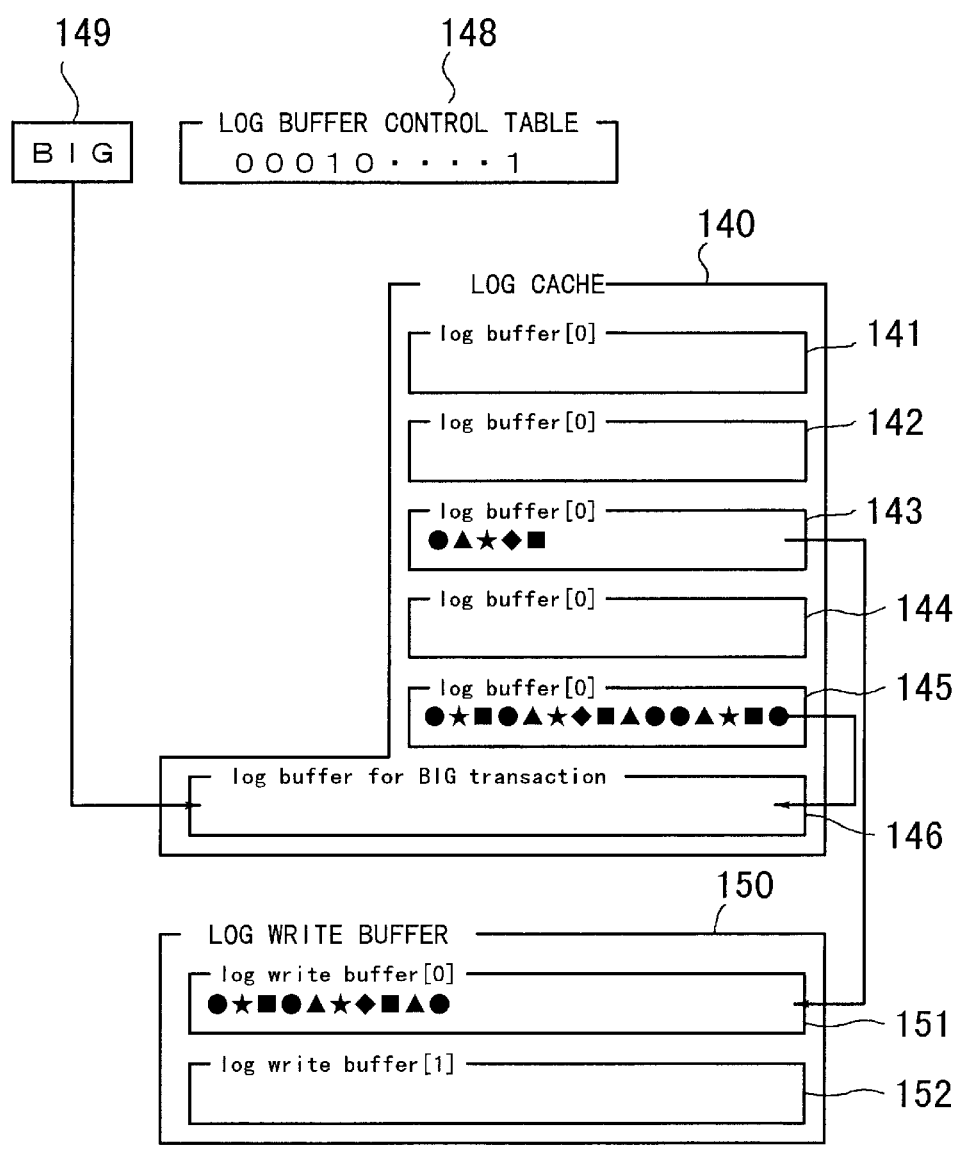
FIG. 20 is a diagram which shows how the log buffers are used to store log records.

FIG. 20 illustrates how the log buffers store log records. In this example, there are five log buffers, including four normal-sized log buffers 141 to 145 and one large-sized log buffer 146. Log buffer control tables 148 and 149 are used to manage those five log buffers 141 to 146. More specifically, the log buffer control table 148 has control flags corresponding to the normal-sized log buffers 141 to 145, each of which indicates whether the corresponding log buffer is used ("1") or not used ("0"). Likewise, the other log buffer control table 149 contains a control flag to indicate whether the large-sized log buffer 146 is used or not.

In FIG. 20, several graphical symbols are used to represent the contents of the log buffers 143 and 145, and the log write buffer 151. They are: tiny black circles, stars, squares, and triangles. Those symbols themselves have no specific meanings, but they simply show that there are some log records waiting write operations. Now the log buffer 145 is filled with log records and has no vacant space. When a normal-sized log buffer has become full, as in the log buffer 145, the logging system moves the log contents to the large-sized log buffer 146, and each time a new updating operation occurs to a certain metadata object, its resultant state is saved into the large-sized log buffer 146 accordingly. When the transaction is finished, its log records are transferred from the corresponding log buffer to the log write buffer 150.

The log write buffer 150 actually comprise a plurality of buffers 151 and 152 to store log records to be output. The log write daemon 105 reads out those records from the log write buffer 150 and writes them into the log volume (not shown) at appropriate times.

Figure 21:
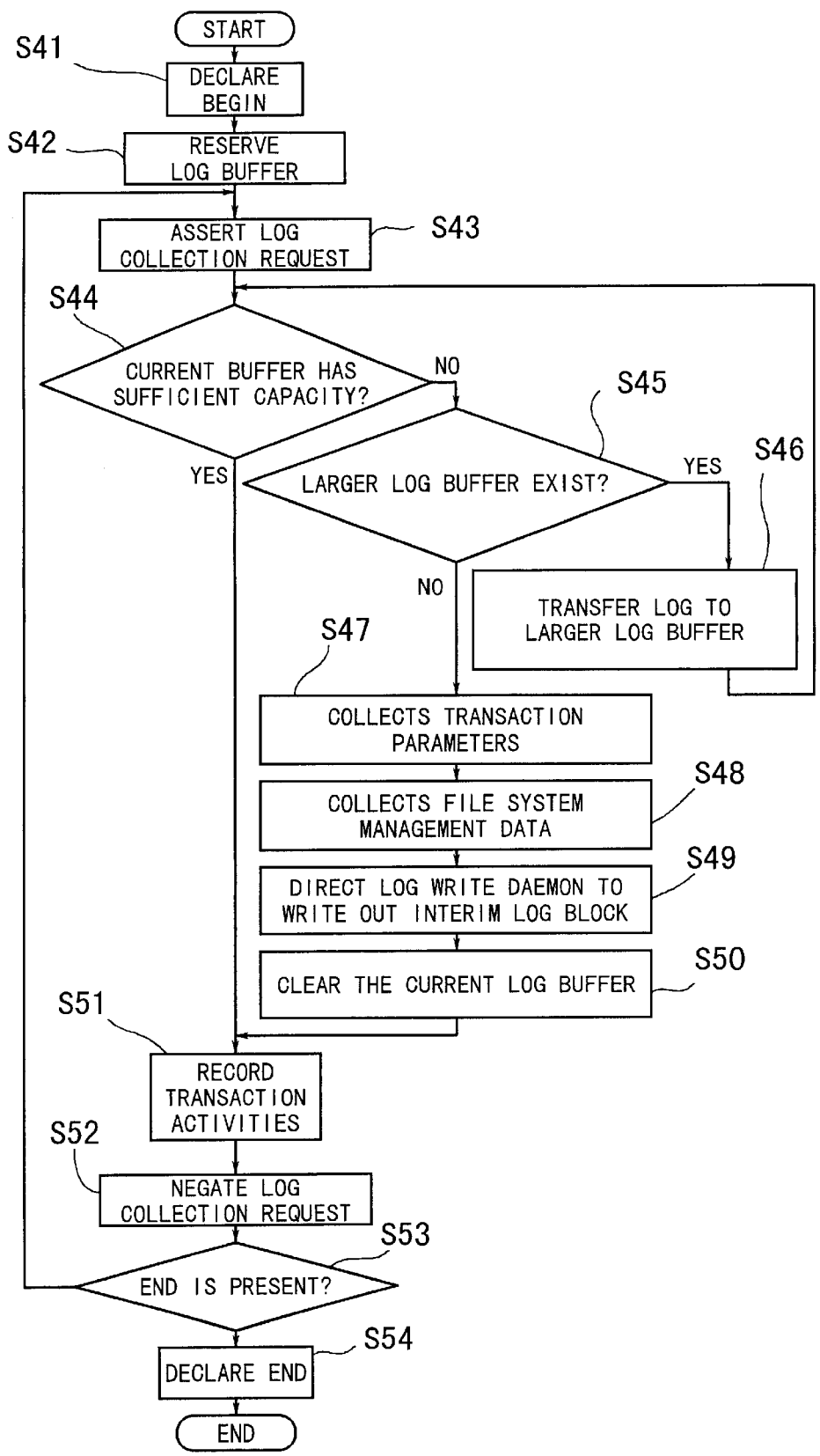
FIG. 21 is a flowchart which shows a log collection process.

FIG. 21 is a flowchart which shows a log collection process. In response to a transaction, the operating system performs this process according to the following steps.

(S41) The transaction declares BEGIN.
(S42) The system reserves a log buffer.
(S43) The system asserts a log collection request.
(S44) The system determines whether the current log buffer can serve the transaction of interest in terms of buffer capacity. If it has sufficient capacity, the process advances to step S51. If not, the process proceeds to step S45.
(S45) The system tries to find another log buffer that is larger than the current log buffer. If a larger log buffer is found, the process advances to step S46. Otherwise, the process goes to step S47.
(S46) Now that a larger buffer is obtained, the system transfers the current log contents to the new buffer. The process then returns to step S44.
(S47) The system collects parameters given to the transaction.
(S48) The system collects management data representing the current state of the file system.
(S49) The current log buffer contains an interim log block of the transaction. The system directs the log write daemon 105 to write out this interim log block to the metadata volume through the log write buffer
(S50) The system clears the current log buffer.
(S51) The system records transaction activities.
(S52) The system negates the log collection request.
(S53) It is examined whether END is present. If present, the process advances to step S54. Otherwise, the process returns to step S43.
(S54) The system declares END, thereby exiting from the process.

A tenth distinctive feature of the present invention is that the proposed logging system produces an interim log block before completion of the current transaction, in preparation for system failure. Particularly, the proposed system is configured to collect parameters given to the transaction and record the collected parameters as part of the log. The parameters included in this interim log block will enable the operating system to redo the last transaction, after restoring the file system up to the point that the system can reach through the use of the log alone.

Figure 22:
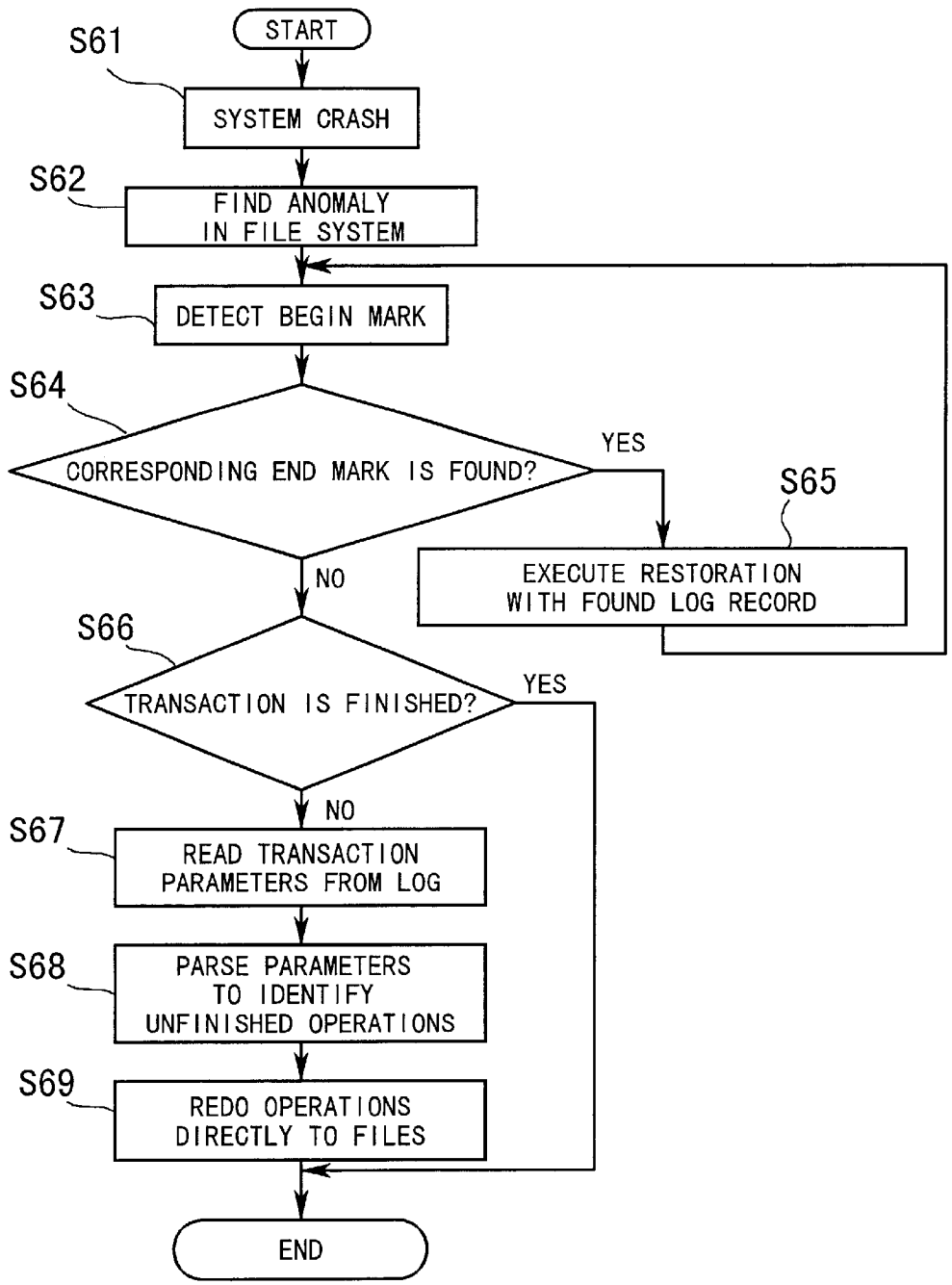
FIG. 22 is a flowchart which shows a process of file system recovery.

FIG. 22 is a flowchart which shows a process of restoring a file system. The operating system performs this process according to the following steps.

(S61) The computer system becomes inoperable for some reason.
(S62) After being rebooted, the operating system may detect an anomaly in the file system. Then it starts a restoration process.
(S63) Scanning the log volume, the system finds a BEGIN mark indicating the beginning of a log record. (see also FIG. 13 for log format).
(S64) The system then examines whether the log record has a valid END mark corresponding to the BEGIN mark. If it has, the process advances to step S65. If no END mark is found, the process advances to step S66.
(S65) With the information recorded between the BEGIN mark and END mark, the system performs restoration operations. The process then returns to step S63.
(S66) The system determines whether the restoration process up to this point has completely reproduced the final state of the transaction of interest. If the transaction is deem to be complete, the operating system exits from this process. If the transaction is not finished, the process advances to step S67.
(S67) The system reads the recorded transaction parameters out of the log record.
(S68) The system parses the parameters to identify what the transaction was attempting at the time of system failure.
(S69) The system applies the identified operations directly to the target files. The system now exits from the restoration process.

Executing the above steps, the proposed system recovers a file system in such way that the semantics of operations are maintained. It restores the consistency in files by completely redoing a transaction, as opposed to conventional systems, which may not always provide complete undo or redo capabilities.

An eleventh distinctive feature of the present invention is that the data processing system has a mechanism to control whether to accept new transactions. Every transactions should previously notify the system of its intention to update metadata objects. The system can put new transactions on hold if any of the following conditions are met, and the requesting transaction have to wait until the system resolves them. Such stumbling blocks to transaction acceptance include:

High occupancy of metadata cache

High nesting levels of transactions that exceed a prescribed threshold

Shortage of free space in the log volume (i.e., most entries are flagged "valid" and cannot be discarded) When either of the above is met, the system stops accepting new transactions and sets a maximum nesting level of transactions, thereby limiting the number of dirty metadata objects held in the metadata cache. This mechanism prevents the system from running out of cache memory resources and hanging consequently. Stopping new transactions ensures stable operation of the system, which is particularly effective in such a situation where it is difficult to record an ongoing transaction within a single log block.

A twelfth distinctive feature of the present invention is that the above transaction limiting mechanism works according to the occupancy ratio of valid log records in a log volume. This feature eliminates the risk of system hang-up, since it prevents log volume exhaustion which may be resulted from frequent metadata updates made by a single or multiple transactions.

Figure 23:
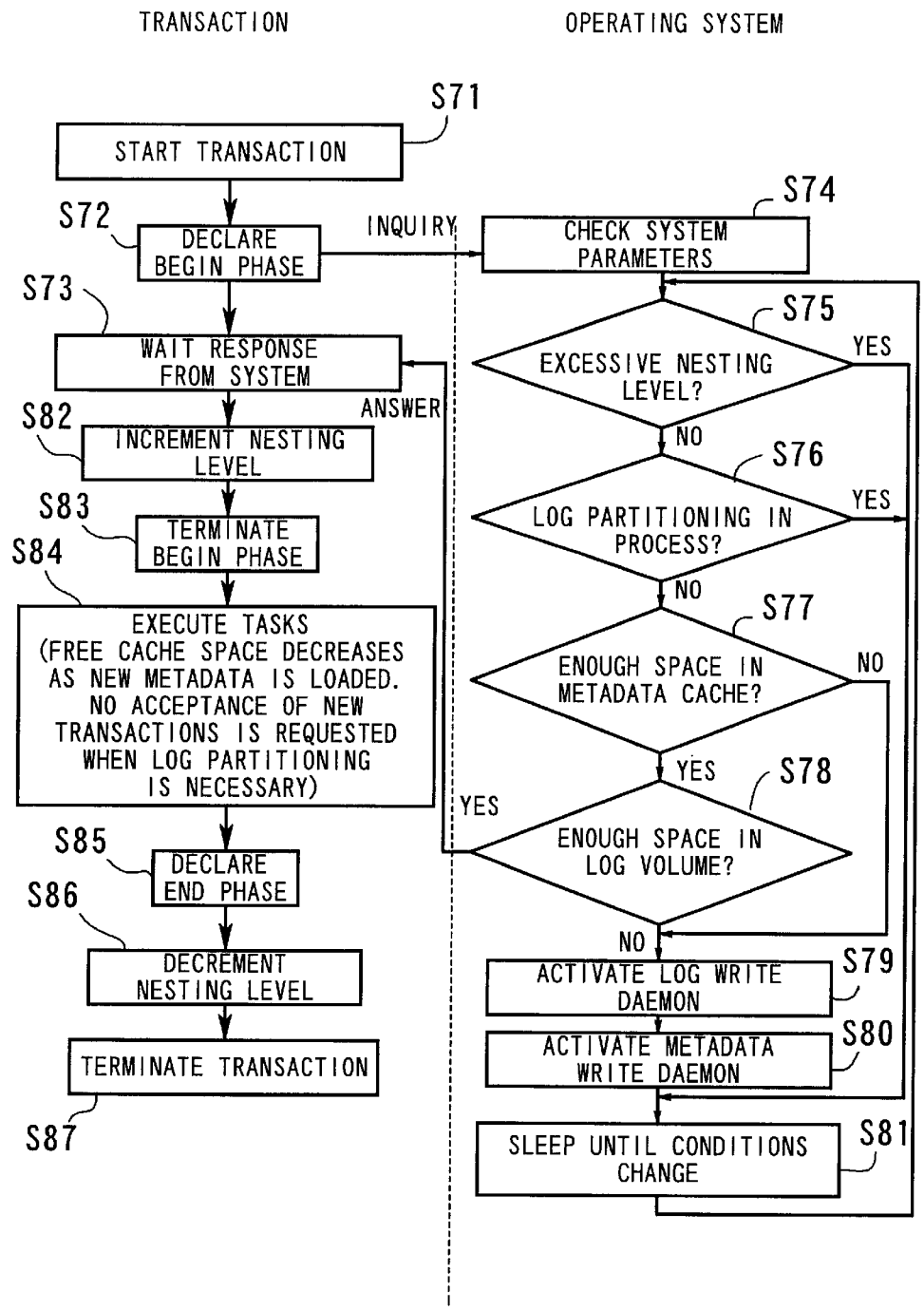
FIG. 23 is a flowchart which shows a process of determining whether to accept a new transaction.

The transaction acceptance mechanism providing the eleventh and twelfth features will now be described in more detail below. FIG. 23 is a flowchart which shows a process of determining whether to accept or hold a new transaction. The transaction on the left-hand side of 23 will interact with the operating system on the right-hand side, according to the following steps.

(S71) A new transaction starts up processing.

(S72) The transaction makes a "BEGIN" declaration to indicate the beginning of transaction. Here, an inquiry is sent to the operating system as to whether the system is ready to accept this new transaction.

(S73) The transaction now enters the wait state. When a positive acknowledgment is returned from the system, it advances to step S82.

(S74) In response to the inquiry, the system starts to evaluate system parameters.

(S75) The system first examines whether the current nesting level exceeds a prescribed level. If it exceeds the threshold, the process advances to step S81. Otherwise, the process advances to step S76.

(S76) The system then examines whether any sub-transactions are in progress. If there is an ongoing sub-transaction, the process branches to step S81 to sleep. If not, the process advances to step S77. The term "sub-transactions" refers herein to such transactions that are created by dividing a single transaction into several pieces, so that log records of each sub-transaction will fit into a single buffer. In other words, "log partitioning" is achieved by dividing a given transaction into sub-transactions.

(S77) The system now examines whether the metadata cache has enough space to accept further metadata objects. If the space is insufficient, the process branches to step S79. If there is enough space, the process advances to step S78.

(S78) The system lastly examines whether the log volume has enough space to store new log records. (Recall that the logging system overwrites obsolete records with new valid log records) If the space is insufficient, the process branches to step S79. If there is enough space, the system returns a positive acknowledgement to the requesting transaction.

(S79) The system activates the log write daemon to gain free space in the log volume.

(S80) The system activates the metadata write daemon to gain free space in the metadata volume.

(S81) The system sleeps until all the suspending conditions are resolved. If they are resolved, the system resumes from step S75.

(S82) Receiving the positive acknowledgment from the system, the transaction increments the nesting level.

(S83) The transaction finishes the phase of "BEGIN."

(S84) The transaction makes access to metadata objects as needed, while causing a cache fill and a subsequent decrease in free memory space. If log partitioning is required, the transaction requests the system not to accept new transactions.

(S85) The transaction declares the "END" of processing.

(S86) The transaction decrements the nesting level.

(S87) The transaction commits after causing the logging system to save log records, if any.

The above section have described twelve distinct features of the present invention. The following section will be devoted to the implementation at a more detailed level, integrating all the features of the present invention.

Before going into details, the process of logging transaction will be outlined below. According to the resent invention, every transaction constituting a file system operation has to make a previous notice to the system, declaring its intention to update certain metadata objects in BEGIN phase. The system allocates a dedicated buffer to the transaction in response to this declaration. The system, however, has an option to suspend the buffer allocation task when too many transactions are running concurrently, or the metadata cache is highly loaded. If this is the case, the transaction has to wait until those stumbling blocks are removed.

During the transaction process, every updated metadata object is copied to the log buffer that has been allocated in BEGIN phase. At the same time, those metadata objects are chained in an appropriate linked list, depending on the type of each metadata.

When all intended updates to the metadata objects are finished, the transaction declares the end of the process. In this END phase, the system transfers the collected log records from the log buffer to the log write buffer, a secondary cache prepared for logging purposes. In addition, it supplies the log write buffer with a copy of the updated metadata objects that are still in the metadata cache. Further, all the metadata entries in the above-mentioned list are transferred to a log write waiting list. The transaction can terminate at this point if it is an asynchronous request. In contrast, synchronous request transactions have to wait until their relevant log records are written out.

Log write transfer operations are performed by an independent background process called a log write daemon. This log write daemon is activated by either of the following events:

wakeup request from a synchronous request transaction wakeup request from a free space monitoring mechanism employed in the metadata cache internal timer expiration Being activated by those events, the log write daemon initiates a single I/O operation to transfer the log records of multiple transactions from the log write buffer to the log volume, and then moves the metadata entries from the log write waiting list to a metadata write list.

On the other hand, I/O operations to transfer data from the metadata cache to the metadata volume are initiated by another agent process called the metadata write daemon, which issues asynchronous write request commands to write back metadata objects that are chained in the metadata write list so as to reflect all updates in the log volume. This metadata write daemon is activated by either of the following events:

shortage of log buffer space shortage of log volume space internal timer expiration The above section has outlined the operation of the proposed logging process, from start to finish of a transaction which updates an object in a metadata volume. The next section will provide further details on (1) how to collect logs, (2) how to save them, and (3) how to reflect updates in metadata storage.

(1) Log Structure (1.1) Log Volume

The contents of a log volume are as follows. Information stored on top of the log volume includes super block and other information about the volume, which are followed by a structure that indicates a range of valid log records. This valid log range structure have the following member variables:

Offset of the first valid log record within the volume

Sequence number of the first valid log record

Offset of the last valid log record within the volume

Sequence number of the last valid log record

It should be noted here that the location of the first or last valid log record indicated by the above structure is not necessarily accurate, and therefore, care must be taken when using this information in replaying log records. As noted earlier, the logging system uses sequential disk access techniques to write records to the log volume with minimum seek operations. This sequential access, however, would be disturbed by access to the valid log range information in the same volume, if they happen at once. Therefore, the proposed logging system updates the valid log range information with less frequency, not every time a log write transfer takes place. This leads to inaccuracies in the above offset values, necessitating the system to search for the very last record when it replays those log records to restore the file system. However, such a penalty is almost trivial, compared to the advantage that it brings; i.e., it eliminates the task of searching through the entire volume.

All the rest of the metadata volume is used as data blocks for storing log records of metadata objects.

(1.2) Basic Structure of Log Block

Records representing updates made to metadata objects and their allocation are stored in the above-described log volume. They are combined basically on an individual transaction basis; the unit of log record is termed a "log block," which contains all detailed updates made by a single transaction. Optionally, however, the logging system may subdivide such log contents into a plurality of partitions. These log partitions are referred to as "sub-transaction logs."

The log partitioning function is carefully designed such that sub-transaction logs will contain necessary information to maintain the consistency of a file system by replaying them, even if the system crashes in the middle of the transaction. However, this does not necessarily mean that the integrity of files can be fully restored by the sub-transaction log replay alone, because some part of the transaction is still incomplete. To overcome this problem, the sub-transaction logs are designed to contain a record called an "operation log," which shows what operations the transaction was attempting at that time. When restoring the file system, the log replayer program would perform pending operations by using operation logs stored as part of the log records. This feature permits the system to reach the final state, reflecting all the operations that should be done by the transaction.

Some transactions are likely to produce sub-transaction logs. Such a transaction places an ultimate end mark at the end of its log record, when it is completely finished. The replayer program uses this ultimate end mark to determine whether to execute operation logs, if any.

(1.3) Collection of Log Records

The logging system collects a record of every update operation made to a metadata object by making a copy of its entire structure, i.e., all data fields describing the metadata object of interest. Regarding the bitmap used to manage the allocation of metadata objects in the metadata volume, the logging system records only a modified part at each update operation. For the super block, which contains overall information about the file system, the logging system records only the information about free data space.

(1.3.1) Inode, Vdata, Free Space Information

The following metadata items are collected on a data block basis, where a data block is a unit of data to be input and output between the main memory and secondary storage device.

inode (data describing a file)

Vdata (directory information, symbolic link data, etc.)

free space information

The reason for collecting records on a block-by-block basis is to simplify the log replaying tasks in "fsck," a file system check utility used to test and repair the file system after an abnormal shutdown. Although it may also be possible to record only the changed part within a data block, instead of copying a whole block, this policy would raise the number of necessary steps in performing a log replay, including: locating a relevant data block, reading out the block, making an update, and saving the block. With a block-based log, however, the log replay can complete in a shorter time since the system only has to overwrite the metadata volume with data block information stored as log records.

The inode blocks, and Vdata such as directory blocks, are protected by a file lock mechanism during update. However, this does not apply to the free space information, meaning that two or more concurrent transactions can happen to change the information consecutively. Suppose, for example, that a first transaction made a modification earlier than a second transaction, and that the second transaction committed before the first transaction. In such a case, the logging system would record the first transaction' outcome after the second transaction's (i.e., old state after new state). These log records produces an inconsistency problem, when replayed, because their alignment does not reflect the true order of modifications.

Taking the above into consideration, the proposed system exceptionally inhibits concurrent execution of transactions if they are directed to the free space information. Namely, this specific information can only be accessed by one transaction at a time, thus allowing the system to record updating operations to it on a data block basis, as with the other data items mentioned above.

(1.3.2) Bitmap

Similarly to the free space information discussed in (1.3.1), the bitmap for managing metadata allocation is not protected by file lock mechanisms, and thus the logging system has a potential problem in copying an entire bitmap which may contain two or more modifications performed by a plurality of concurrent transactions. Particularly in such a situation where two transactions were racing and the follower finally outran the foregoer, two data updates made by them would be recorded in backward order, causing a new bitmap to be overwritten with an old bitmap.

Therefore, the proposed system watches which bit of the metadata allocation map is set to zero or one, and records only those changed items, not the entire map. Since this policy lets concurrent transactions to leave their records as separate log entries, the metadata allocation map will never be brought back erroneously to an old state in log replay, except in the case that two transactions happen to free and take up the same resource subsequently. Suppose that one transaction frees a certain storage space by resetting a corresponding bit to zero, and soon after that, another transaction takes up the same space by setting the bit to one. But, if the latter transaction commits before the former transaction ends, the transaction log replay would nullify the resource allocation to the latter. The proposed system works around this problem by creating a duplicated bitmap block for resource allocation purposes.

(1.4) Log Record Format (1.4.1) Regular Transaction Log

Whether the logging mechanism is working or not, the system has to support concurrent execution of multiple threads to some extent, because it is an indispensable feature to satisfy the required performance level. Log records, however, are saved in a log volume on an individual transaction basis. Each unit of log information, which represents the result of a series of actions made by a transaction, consists of the following items:

BEGIN Mark

Repeat (Header+Log Entry)

END Mark

This data is referred to hereafter as a "log block." Each log block begins on a boundary between physical disk blocks, while they do not necessarily end at such specific boundaries.

(a) BEGIN Mark

BEGIN mark, which is created at the beginning of a transaction, contains the following items:

Magic Word

A codeword indicating the beginning of a transaction.

Transaction Type Code

A codeword indicating the type of the transaction being logged. The system would use this information to grasp the outline of what updates to follow, when going through the log.

Log Sequence Number

An incremental number assigned to each logged transaction. Of all the log blocks stored in a log volume, the one having the smallest sequence number contains records of the oldest transaction. The log sequence numbers are generated by a 64-bit counter, which is so wide that it is practically free from overflowing. Theoretically, it is expected to work for about 40,000 years, which is sufficient for the system's lifetime. Recall that conventional systems initialize the log volume and log sequence number counter when log replay is finished. In contrast, the system of the present invention resumes logging operations, simply using subsequent sequence numbers, without clearing the counter or log volume. This configuration is advantageous in that the system recovers faster since the time-consuming task of log volume initialization is not necessary.

Log Block Size

The size of the log block, actually indicating the displacement of END mark relative to BEGIN mark. When replaying log records, the system uses this displacement information to jump from BEGIN mark to END mark.

Examining the END mark information, the system determines the validity of each log block.

(b) Header

Header information is attached to each log entry to describe where the updated object is stored and what kind of metadata it is. More specifically, the header contains the following items:

Metadata Type

Metadata type indicates the type of the metadata in the log entry field. With this information, the log replayer program knows the length of the log entry field.

Metadata Volume ID

Identifier of a metadata volume that contains the metadata of interest. With this identifier, the log replay program locates the destination volume, when writing back a recorded metadata object.

Local Metadata ID

Identifier assigned to the metadata object of interest locally within a metadata volume, which increases sequentially from zero. The log replayer program writes back each logged metadata entry to its relevant metadata volume, translating the local metadata identifier to its block position within a relevant metadata volume, when writing back a recorded metadata object. This, in turn, means that the logging system is designed to record the location of each block only in the form of a logical address within a volume, without spending extra computing power to calculate its physical location.

When logging a change in a bitmap, the local metadata ID field is used to contain the ID of a metadata object that corresponds to the changed bit, not the ID of the bitmap itself.

(c) Log entry

The log entry field holds information regarding an update made to a specific metadata object or a bitmap. In the case of metadata, this field holds an entire block containing the metadata object of interest, where the term "block" denotes a unit of data being managed as a single unit. A directory block, for example, is logged as a 1024-byte long record.

For bitmap, the log entry field is used to store a record showing which bit was set to "1" or reset to "0," rather than copying the entire bitmap. When repairing a file system, the log replay program first refers to the header information to identify and read out a relevant bitmap. It then modifies a particular bit of the bitmap according to the log record, and writes back the bitmap to its home location.

(d) END Mark

As the counterpart of the BEGIN mark, the END mark contains a magic word, a log sequence number, and a log block size. Unlike the BEGIN mark, however, this END mark is required to have a unique bit pattern in a more strict sense to prevent any other portion, including metadata part, of the log block from being misidentified as an END mark. As mentioned earlier, the transmission log could lack its last END mark if the system crashed in the middle of writing a log block to the log volume, and the presence or absence of a valid END mark will be the key to correct log replay operations. If there is no valid END mark corresponding to a BEGIN mark, the log replay programs should not use such a log block to repair the file system. For this reason, the END mark begins with a bit pattern which is absolutely distinguishable from other portions. More specifically, the END mark begins with a 64-byte unique codeword (e.g., sixteen consecutive instances of a unique 4-byte code), effectively preventing any metadata patterns from being misinterpreted as an END mark. This long codeword is then followed by a magic word, log sequence number, and block size. If there remains a space in the disk block, the above codeword will be inserted again until the next block boundary is reached.

(1.4.2) Logging of Big Transactions

When a transaction involves many updating operations and may potentially produce a large amount of log information, this transaction is referred to as a "big transaction" in contrast to a regular transaction. If this is the case, the logging system partitions the log into a plurality of sub-transaction log blocks which can be handled with a limited buffer space and log volume. Each sub-transaction log provides the log replay program with sufficient information to keep the file system consistent at a specific point within the transaction. However, when the system crashed during such a big transaction, the integrity of files could not be restored by replaying an incomplete set of sub-transaction logs. To solve this problem, every sub-transaction log block contains extra information called an "operation log." Actually, the log record of a big transaction appears in the following way.

BEGIN Mark
Operation Log Entry
Repeat (Header+Log Entry)
END Mark
:
: (repeat the above)
:
BEGIN Mark
Operation Log Entry
Repeat (Header+Log Entry)
Extreme END Mark Notice that the last log block is different from other blocks in that it has a special end delimiter called "Extreme END Mark" to indicate the very end of one unit of transaction log. It should be also noted that, while the above log format includes a plurality of log blocks, big transactions may end up with a single sub-transaction log block, depending on the circumstances. In this case, the sole log block is terminated by an Extreme END mark, rather than an END mark. The details of those log components will be described below.

(a) BEGIN Mark

The BEGIN mark of a sub-transaction log block is identical to that of a regular transmission log; i.e., it consists of a magic word, a transaction type code, a log sequence number, and log block size. The transaction type code is used here to determine whether the present log block is of a regular transaction or of a big transaction, since log partitioning occurs only to such a particular class of transactions that manipulate data areas or perform management tasks for storage space. If the transaction type code extracted from the BEGIN mark indicates this type of transaction, that log block is a sub-transaction log block, and thus its operation log entry appears next to the BEGIN mark. This rule applies to the case where a big transaction has ended up with only one sub-transaction log block.

(b) Operation Log Entry

The BEGIN mark is immediately followed by an operation log entry field which stores the arguments given to the big transaction of interest when it was called. The arguments may include such information as: the name of a file to be manipulated, how much the file should be truncated, what data should be appended to the file, and the like. That is, the operation log information shows what actions were intended by the transaction. In the event of an abnormal shutdown, the log replayer program would use this information to redo an unfinished transaction by directly manipulating the file system.

The operation log entry generally contains a plurality of parameters which may vary from transaction to transaction. The log replayer program identifies the kinds and sizes of operation log parameters by examining the transaction type code provided as part of the BEGIN mark.

(c) Header

Identical with the regular transaction log header. See (1.4.1)-(b) for details.

(d) Log Entry

Identical with the regular transaction log entries. See (1.4.1)-(c) for details.

(e) END Mark and Extreme END Mark

Those two END marks function as the delimiters of sub-transaction log blocks, in the same way as those of regular transmission log blocks do. The END mark contains a magic word, a transaction type code, a log sequence number, log block size, and a unique stuffing bit pattern to fill up the rest of the disk block. The Extreme END mark contains the same, but it has a different magic word to distinguish itself from other END marks within a transmission log.

As previously stated, a big transaction may produce one or more sub-transaction log blocks, where the number of log blocks may vary depending on the circumstances. If the resultant log is a single block, the Extreme END mark is used to terminate it. If two or more sub-transaction log blocks are produced, only the last log block has an Extreme END mark, while the others are delimited by normal END marks.

Since the Extreme END mark symbolizes the commitment of a big transaction process, the log replayer program uses this mark to decide whether to perform an operation log replay. More specifically, if a given transaction log lacks its final sub-transaction block with an Extreme END mark, the log replayer program will redo the transaction by replaying its operation log.

(2) Log Collection Mechanism (2.1) Log Buffer Management

While the system allows concurrent processing of multiple transactions, their log records must be saved on an individual transaction basis. For this reason, the logging system sorts out the collected metadata updates into separate groups before sending them to the log volume. Separate memory locations, called "log buffers," are thus allocated to store such log entries of different transactions. The system sets up those log buffers in a static manner when mounting a file system. Once established, the buffers cannot be reconfigured or resized during file system operation.

The number of log buffers is determined on the basis of a concurrency policy concerning how many transactions are allowed to run in parallel. While limiting the concurrent execution of transactions would be a factor in performance degradation, this provides the logging system with several advantages. For instance, it simplifies log replay processes. Also, it avoids complicated tasks for managing a large buffer space. Therefore, the proposed system sets a certain upper limit to the concurrency of transactions.

The logging system assigns a log buffer to each transaction when it is accepted. Produced logs are accumulated in the buffer during the transaction process, and then copied to the log write buffer when the transaction is committed. An agent process called the "log write daemon" is responsible for performing disk I/O operations to transfer the records from the log write buffer to the log volume.

To handle a big transaction, the logging system provides for one special log buffer called a "big log buffer" which is larger than other "regular log buffers." This big log buffer, however, may not be immediately assigned to every big transaction to be processed by the system. Rather, the logging of a big transaction begins with a regular log buffer. More specifically, the log buffer allocation for a big transaction is performed through the following steps (a) to (c).

(a) The logging system allocates a regular log buffer to a big transaction and collects metadata update records, while watching the buffer occupancy. At appropriate times, the system checks whether the current log buffer will be able to accommodate all the log information to be produced by the ongoing transaction. If the current log buffer has a sufficient capacity, the system accepts another big transaction, if any.

(b) If the ongoing transaction is relatively active and the logging system expects that the current regular log buffer will be overwhelmed by the log information, the system copies the present logs to the big log buffer to continue logging tasks.

(c) If the ongoing transaction is so active that even the big log buffer is expected to fail in accommodating all records to be produced, the logging system performs log partitioning; i.e., it creates a sub-transaction log block to reduce the current buffer occupancy.

The data duplication at step (b) may appear to be burdensome. In reality, however, this burden is tolerable for the system, because most transactions update metadata at a moderate pace, without the need for migrating from a regular log buffer to a big log buffer.

The logging system manages the allocation of regular log buffers by using a bitmap that indicates which buffers are free and which are allocated, together with an array structure consisting of as many elements as the number of log buffers, each holding log buffer address and current log size. Free log buffers are represented as "zero" bits in the bitmap. When starting to handle a new transaction, the system searches the bitmap to find a free log buffer. If a "zero" bit is found, the system sets the bit to "one" (i.e., "allocated") and assigns the corresponding log buffer to the new transaction, as well as giving the bit number as its transaction ID.

In the case that the ongoing transaction is a truly active big transaction, the system initiates a migration of log records from the current regular log buffer to the big log buffer. The logging system frees up the previous regular log buffer for use in the next transaction, if any.

As previously noted, the records accumulated in a log buffer are copied to the log write buffer when the transaction is committed, and the log write daemon initiates a disk I/O operation to write those transaction logs into the log volume all at once. During the I/O operation, the log write daemon locks the log write buffer to protect it from being overwritten with new log blocks. This, in turn, means that the log buffers cannot send their data until the log write buffer is flushed. To avoid any performance degradation resulting from this, the logging system is equipped with two log write buffers and uses them in alternating modes; i.e., when one buffer is outputting data in write mode, the other is accepting new data in append mode. The system has a mechanism to manage those dual log write buffers, maintaining the following information:

Which buffer is in append mode and which is in write mode.

How much log information each log write buffer has.

(2.2) Handling of Big Transactions

Big transactions denote such a class of transactions that manipulate tree structures for managing free storage space and/or allocated storage space. This kind of transactions may extensively modify the target tree structure, producing many sub-transaction log blocks.

Suppose here that such big transactions are running in parallel and actively updating various metadata objects. Each updating operation makes the corresponding metadata cache entry "dirty" (i.e., "modified"). Because the metadata cache is limited in capacity, it would be filled with dirty entries sooner or later. Now that the metadata cache has no space to load new metadata objects, the ongoing transactions are unable to proceed to the next step. Since the transactions cannot commit, the metadata cache is unable to flush its entries. That is, the system has entered an undesirable deadlock condition.

To avoid the above scenario, the system inhibits the concurrent execution of big transactions. In other words, big transactions must be serialized; i.e., they will be processed one by one. However, many transactions are regarded as big transactions, aside from how may updates they would actually make. The above simple strategy, if implemented, would seriously slow down the system because all those transactions should be serialized.

It is known that, while there are many potential big transactions, most of them behave like regular transactions in normal conditions. If this is true, the above serialization problem can be solved by equating big transactions with regular transactions at least in the initial stage. That is, the system initially assigns a regular log buffer to a big transaction, just as it does to regular transactions. Note, however, that the system allows only one big transaction to have a log buffer allocated at any given moment. Unlike the regular transactions, another pending big transaction has to wait until the present big transaction is finished or degraded in the following way.

When the present big transaction turns out to be comparable to a regular transaction in terms of the frequency of metadata updates, the system will degrade it to a regular transaction. Since this regular transaction continues to use its regular log buffer, it is no longer necessary to keep the big log buffer unallocated. Therefore, the system accepts the next big transaction, allocating a log buffer to it.

If the ongoing transaction exhibits a certain activity level in updating metadata objects, the system copies its log records from the current regular log buffer to the big log buffer. In this case, the system keeps other big transactions wait until the current big transaction is committed.

(2.2.1) Criteria for Degrading and Log Partitioning

As previously discussed, the system handles a big transaction in various ways, depending on the free space left in a log buffer and the expected amount of log information. The following summarizes the criteria for degrading, migrating, and partitioning.

(a) Degrading

The system degrades a big transaction to a regular transaction when it is assured that the currently assigned regular log buffer has enough space to record all future metadata updates to be made by the transaction.

(b) Migrating to Big Log Buffer

The system migrates to the big log buffer when the currently assigned regular log buffer is unable to provide sufficient space to accommodate the maximum amount of update information expected at the next step of the transaction.

(c) Log Partitioning

The system partitions the log into sub-transaction logs when the big log buffer is unable to provide sufficient space to accommodate the maximum amount of update information expected at the next step of the transaction.

(2.3) Logging of Regular Transactions

The process of logging a regular transaction comprises the following eight steps (a) to (h), which are executed in three phases (P1) to (P3).

(P1) LOG_BEGIN Phase
        (a) Allocate a regular log buffer
        (b) Place a BEGIN mark
    (P2) Log Collection Phase
        (c) Record updated objects with header information
        (d) Enter updated objects to metadata write list
    (P3) LOG_END Phase
        (e) Place an END mark
        (f) Copy logs to log write buffer
        (g) Write logs to log volume
        (h) Reset Pinned-down flags The following paragraphs will present the details of these phases and steps.

(2.3.1) LOG_BEGIN Phase

This phase starts with LOG_BEGIN which declares the beginning of a transaction, and hence the beginning of logging operations for it. Every transaction (i.e., called function) should contain this LOG_BEGIN declaration and a LOG_END declaration alike. When a new transaction is invoked, the system refers to a parameter called the "maximum number of concurrent transactions" defined to limit the number of transactions that can be concurrently executed. If the concurrency level of transactions has already reached this limit, any newly called transaction has to sleep until any one of the ongoing transaction is committed.

(a) Allocate a Regular Log Buffer

If the number of ongoing transactions equals the number of log buffers, it means that the concurrency level has already reached the predefined limit. Since there is no free log buffer, the new transaction has to enter the sleep state. Otherwise, the logging system can allocate a log buffer to the transaction; that is, it finds a free log buffer by scanning a buffer allocation map that holds the usage status of individual buffers, sets the corresponding bit in the buffer allocation map, and increments the concurrent transaction counter.

(b) Place a BEGIN Mark

The logging system places a BEGIN mark at the top of the log buffer.

(2.3.2) Log Collection Phase

Some entries in the metadata cache may be accessed in the course of a transaction, and in this phase, the logging system collects information on which metadata object the transaction updated, and how the result was. Since updates are made through write operations, no log record of a metadata object will be produced if it is only read.

(c) Record Updated Objects With Header Information

After finishing manipulation of a metadata object on the cache, the transaction calls a release function to free the object, explicitly indicating that it has been updated. In response to this indication, the logging system collects its log record. Update to an inode is logged when the transaction releases the lock for the inode and its relevant file object. More specifically, the logging system writes a header to the log buffer and then enters a record of the updated object. The style of this record depends on what object should be logged, as described below.

(c-1) Bitmap: Logging of a bitmap update occurs when a metadata object is allocated or deallocated. The log header field contains the metadata ID, and the log entry field holds information on what bit manipulation was made (e.g., "0" to "1" or "1" to "0").

(c-2) inodes and other metadata objects: The log entry field contains the whole image of the updated object.

(c-3) Superblock: A regular log block format is used to record superblock updates only when a big transaction is degraded to a regular transaction. In this case, the timestamp (or sequential number) and free space size are recorded in the log entry field.

After storing the above information, the logging system increase the log size accordingly, which will be entered to the log size field at the end part of the log buffer.

(d) Enter Updated Metadata to Metadata Write List

Because of its limited size, the metadata cache sometimes has to force out its entries and create space to handle new transactions. To this end, the metadata cache has a flushing mechanism which creates free slots by writing back old, unnecessary cache entries. However, metadata objects updated by a transaction should stay in the metadata cache until the transaction's log block is saved into the log volume. To ensure this, all the updated metadata objects are chained in a list of dirty blocks, which is used by the metadata write daemon to reflect the updates in the metadata volume. This list is called the metadata write list.

(2.3.3) LOG_END Phase

The commitment of the transaction effects a transition to this phase, in which the logging system produces an END mark while leaving log writing tasks to the log write daemon.

(e) Place an END Mark

The logging system places an END mark at the tail end of the log, so that it will serve as the counterpart of the BEGIN mark created in LOG_BEGIN phase.

(f) Copy Logs to Log Write Buffer

The logging system transfers the log contents from the log buffer to one of the log write buffers that is in append mode. A log sequence number is assigned to the log at this step, and it is entered to the BEGIN and END marks. The log write buffer size should be increased by the log length, which has been maintained in the "terminal" of the log buffer. (The "terminal" of a log buffer is where information about the structure of the buffer itself is stored.) The transaction is allowed to end at this step (f) if it is an asynchronous request, freeing its log buffer by resetting the corresponding bit in the buffer allocation map.

(g) Write logs to log volume

The log write daemon transfers the logs from the log write buffer to the log volume.

(h) Reset pinned-down flags

The log write daemon resets all relevant pinned-down flags which were set when the transaction released the updated metadata objects.

The transaction can terminate at this step without waiting for the completion of flag reset operations.

(2.4) Logging of Big Transactions

Big transactions are logged in a similar way to regular transactions, except for the selection and usage of their log buffers. Depending on the surrounding conditions, big transactions may experience a migration to a larger log buffer, and their log records may be partitioned into smaller units. The actual process of logging a big transaction comprises the following steps (a) to (h) which are executed in three phases (P1) to (P3).

(P1) LOG_BEGIN Phase
  (a) Allocate a regular log buffer
  (b) Place a BEGIN mark
  (c) Record operation logs
(P2) Log Collection Phase
  (d) Record updates in BTF/BTA lists (Updates to free space information are logged by entering them to BTF/BTA lists)
  (e) Place header and copying updated object (Updates to other metadata are logged by copying them to the log buffer, together with header information)
  (f) Enter updated metadata to pinned-down list
  (g) Determine whether to migrate to big log buffer (If the current regular log buffer is insufficient, logs are moved to a big log buffer. If sufficient, the next big transaction is accepted.)
  (h) Determine whether to perform log partitioning (If necessary, a sub-transaction log is created and passed to the log write daemon for output.)
(P3) LOG_END Phase
  (i) Place Extreme END mark
  (j) Copy logs to log write buffer
  (k) Write logs to log volume
  (l) Reset pinned-down flags The following paragraphs will present the details of these phases and steps.

(2.4.1) LOG_BEGIN Phase

Logging of a big transaction starts with a regular log buffer as in the case of regular transactions.

(a) Allocate Regular Log Buffer

Transactions are supplied with their log buffers only if some free log buffers are available in the log cache (i.e., the number of concurrently running transactions has not yet reached the predetermined limit). While this rule applies to both regular and big transactions, the log buffer allocation for a big transaction further depends on whether another big transaction has already been in service. For this reason, the system maintains a flag that is set to "1" when a certain big transaction is in process. When this big-transaction-in-progress flag indicates no ongoing big transaction, the system searches the buffer allocation map to find a free buffer and assigns it to the requesting big transaction. It sets the corresponding bit in the map to "1" accordingly, and the above flag as well. If the big-transaction-in-progress flag indicates the presence of an ongoing big transaction, any new big transactions should sleep until the present one is finished.

(b) Place BEGIN Mark

The logging system places a BEGIN mark, the transaction type field of which indicates that the transaction is a big transaction and thus an operation log field is to follow.

(c) Record Operation Logs

Operation logging permits the system to redo a transaction in case of an abnormal shutdown, even if only a part of its activity is recorded as sub-transaction logs. The operation log field is used to store parameters which have been originally given to each function to be logged and are now converted to a suitable form for later log replay operations. Memory address parameters, for example, are recorded in this field after being converted to offset addresses within a metadata volume.

(2.4.2) Log Collection Phase (d) Record Updates in BTF/BTA Lists

A certain class of big transactions which update free space information may repetitively modify a particular metadata object, and recording every occurrence of such modifications would fill up the log buffer or log volume easily. To avoid this problem, the logging system uses a list structure to record which metadata objects have been updated, holding only one entry for each object regardless of how many times it is updated. In the present implementation, there are two dedicated lists named "BTF list" and "BTA list," which are used depending on the state of metadata objects. An object is said to be "dirty," if it is linked to either list. The system enters an object to either list when it is updated for the first time, which is accomplished by providing a pointer to the list. The second and further updates require no special actions since the pointer is already defined. When adding a metadata object to either list, the system also updates the log size to reserve a log write buffer space for later use.

(e) Place Header and Copying Updated Object

It is unlikely that a single transaction repeatedly holds and releases a particular metadata object if it is other than the free space information described at step (d). Therefore, the logging system handles this kind of metadata objects in the same way as in a regular transaction. That is, the system simply copies an object to the current log buffer, together with header information, each time the current transaction releases it from the lock condition, and then it updates the log size accordingly.

(f) Enter Updated Metadata to Pinned-down List

As previously mentioned, updated metadata objects should not be written back to metadata volumes until the corresponding log records are saved into the log volume. In other words, when a transaction is under way, metadata objects updated by the transaction have to be pinned down to the metadata cache. The logging system has a list structure to manage whether each metadata object is in the pinned-down state.

(g) Determine Whether to Migrate to Big Log Buffer

During a big transaction, the logging system determines the policy of buffering the produced log records, estimating how many metadata objects the transaction will update.

g-a) If the current regular log buffer is unable to accommodate all log records to be produced at the next step of the transaction, the logging system decides to change it to a big log buffer.

ga-1) The logging system transfers the logs accumulated in the current log buffer to the big log buffer, while maintaining links to the BTF list. The BTA list, on the other hand, is moved to a terminal for the big transaction.

ga-2) The current big transaction continues its processing, using the big log buffer to accumulate its logs.

g-b) If the current regular log buffer has sufficient space to accommodate all expected log records to be produced by the transaction, the logging system decides to degrade the transaction to a regular transaction. However, this degradation to a regular transaction does not occur if the transaction has already created a link to the BTF list, and in this case the BTF list remains unchanged.

The logging system resets the big-transaction-in-progress flag to indicate that no big transaction is under way, and increments the concurrent transaction counter. If there is a pending big transaction, the system wakes up it and accepts the execution. The transaction continues its processing, using the current regular log buffer.

g-c) The logging system allows the transaction to continue to use its regular log buffer, is still unable to determine whether to migrate to a big log buffer.

(h) Determine Whether to Perform Log Partitioning

In accordance with the criteria for log partitioning described in ( ), the logging system determines whether to divide the current big transaction into sub-transactions. The logging system continues to collect logs in the big log buffer as long as it has sufficient space. When it becomes necessary to divide the transaction log, the logging system takes the following series of actions:

Copy the updated free space information to the log buffer, by tracing the BTF list Place an END mark Copy the log to the log write buffer Update the log write size Activate the log write daemon Enter the updated objects to the metadata write list, while resetting their pinned-down flags (this allows the metadata write daemon to execute write back operations at any time)

Place a BEGIN mark at the top of the big log buffer

Create operation logs (2.4.3) LOG_END Phase

The commitment of the present transaction effects a transition to this phase, in which the logging system produces an END mark while leaving log writing tasks to the log write daemon.

(i) Place an Extreme END Mark

The logging system places an Extreme END mark at the tail end of the log. The Extreme END mark differs from the normal END mark only in its magic word value.

(j) Copy Logs to Log Write Buffer

The logging system transfers the log contents from the log buffer to one of the log write buffers that is in append mode. A log sequence number is assigned to the log, and the log write buffer size is increased by the log length. When the transaction is a synchronous request, it has to wait for the log write daemon to completely write the log to the log volume. Otherwise (i.e., it is an asynchronous request), the transaction can immediately proceed to the next step. The system resets the big-transaction-in-progress flag, and wakes up a sleeping big transaction, if any.

(k) Write Logs to Log Volume

The log write daemon transfers log data from the log write buffer to the log volume.

(l) Reset Pinned-down Flags

The log write daemon resets all the relevant pinned-down flags which were set when the logging system copied updated metadata objects. The transaction can terminate at this step without waiting for the completion of flag reset operations.

(2.5) Log Write Daemon

The log write daemon is an agent process dedicated to writing of transaction logs to the log volume, serving for a plurality of transactions which are processed concurrently and completed individually. The system activates this daemon when mounting a file system, and deactivates it when unmounting the file system. That is, the system creates a separate thread for each file system.

Upon completion of each transaction, the logging system gives an END mark to its log record in the log buffer and copies the buffer contents to the log write buffer. This log write buffer permits the system to write two or more instances of transaction logs to the log volume with a single disk I/O operation. In spite of causing a burden of memory-to-memory data transfer, the log write buffer provides more benefit to the system performance by avoiding frequent disk I/O operations.

A log buffer is deallocated when its contents are copied to the log write buffer; its entry in the allocated buffer list is removed, and instead, it is linked to the free buffer list. If the transaction is asynchronous, the system decrements the concurrent transaction counter, thus permitting another transaction to proceed.

The log write daemon transfers new records to the log volume at regular intervals, or on demand from any transaction that is specified as a synchronous request. The system actually has two log write buffers; one buffer accepts new transaction logs, while the other outputs its data to the log volume. Since the two buffers change their roles alternately, one buffer is always available to ongoing transactions, which allows them to pass their logs at any time to terminate themselves.

(2.5.1) Operation of Log Write Daemon

The log write daemon is a relatively simple process, which operates in the following way.

(a) Alternate modes of log write buffers (b) Transfer logs to log volume (c) Write valid log range information (d) Move metadata entries from log write waiting list to metadata write list (e) Sleep for a predetermined time (f) Wake up and go to step (a)

The details of those steps (a) to (f) will now be described below.

(a) Alternate Modes of Log Write Buffers

To avoid data conflict problems, any transactions must not modify the log write buffer when it engages in disk I/O operations. This condition is ensured by the provision of two identical log write buffers, which alternately operate in write mode or in append mode. The log write daemon controls the operation mode of each buffer, so that one log write buffer can accept new transaction logs while the other writes out its data to the log volume. Transactions are allowed to copy their log records only to the one working in append mode, no matter which one of the two log write buffers it may be.

(b) Transfer Log Records to Log Volume

The log write daemon first check the total length of log records contained in the log write buffer. If the log write buffer is empty, there is no need to initiate an I/O operation, and therefore, the log write daemon enters the sleep state. If the log write buffer has log records, the daemon writes them into the log volume according to the following steps (b1) to (b3).

(b1) Check Free Space in Log Volume

The log write daemon checks free space and its location in the log volume according to the following procedure.

Let A denote the top address of the log volume, B the address of the oldest valid log block, C the address given by the current log write pointer, D the end address of the log volume. All those parameters are given as offset address within the log storage device. The address B shows the beginning point of what was explained as the "valid log range" in earlier part of the description, which also means the log location corresponding to the oldest entry of the metadata write list. Comparing those address parameters, the log write daemon then determines where to start writing the log records. More specifically, the log writing operation can be performed only in the following four cases.

If $A<B \leq C<D$, and if the log write size is not greater than (D-C), the log writing should start from the address C.

If $A<B \leq C<D$, and if the log write size is greater than (D-C) but not greater than (B-A), the log writing should start from the address A.

If $A<C \leq B<D$, and if the log write size is smaller than (B-C), the log writing should start from the address C.

When any of the above conditions are met, it is not possible to write out the log records. In this case, the log write daemon has to go into the sleep state after activating the metadata writing daemon. The activated metadata writing daemon tries to reduce the metadata write list entries by writing them back to the metadata volume. This advances the position of the oldest valid log block, and thus increases the address parameter B. The metadata write daemon then wakes up the log write daemon, which executes again the step (b1) from the beginning, to reevaluate the free space size.

(b2) Write Logs

According to the result of step (b1), the low write daemon writes the log records into the log volume in synchronous request mode.

(b3) Check Errors

The log write daemon checks whether any error was detected during the log writing operation. No description will be provided here regarding the handing of such errors.

(b4) Check Free Space

After finishing the log writing operation, the log write daemon checks again how much free space is left in the log volume, calculating it in a similar way to step (b1). If the remaining space is deemed insufficient, it activates the metadata write daemon in normal mode or urgent mode, depending on the amount of the space.

(c) Write Valid Log Range Information

The valid range of log records, which denotes an essential set of log records required for file system recovery, is now given as a range that begins at the addresses B (oldest log block location) and ends at the address C (current log block location). This valid log range information should also be written to the log volume periodically. Here, the interval should be carefully determined, not to interrupt too much the sequential disk access in log writing operations. The log write daemon writes valid log range information every few times it flushes the log write buffer.

(d) Move Metadata Entries From Log Write Waiting List to Metadata Write List

While the log write daemon has saved log records of one or more transactions into the log volume at step (b), while the updated metadata objects corresponding to those log records are still in the metadata cache. They are all in the "pinned-down" state, meaning that they have not yet been reflected in their home metadata volumes. As previously noted, such cache entries are chained in the log write waiting list. The log write daemon now traces this list and adds its entries to the metadata write list, allowing the metadata write daemon to write them back to the metadata volumes at any time.

(e) Sleep for a Predetermined Time

Principally, from the system's viewpoint, the logging mechanism writes transaction logs on an asynchronous basis. Unless otherwise specified as synchronous requests, transactions are allowed to terminate themselves without waiting for the completion of log writing operations for them. Each time the log write buffer is flushed, the log write daemon sleeps for a while. This sleep period permits a plurality of transactions to fill the buffer, resulting in a reduced frequency of disk I/O activities.

(f) Wake up and Repeat From (a)

Waking up by itself after a predetermined sleep period, the log write daemon repeats the above process from step (a). It may be woken up by some other events as will be described later in the next item (2.5.2).

(2.5.2) Activation of Log Write Daemon

The log write daemon is activated (or woken up) by the following events and performs log writing operations.

Interval Timer

The log write daemon wakes up by itself at predetermined intervals to execute log writing operations.

Transaction With Synchronous Request

Some transactions are called as synchronous requests; i.e., they cannot terminate until their log records are successfully written into the log volume. This kind of transactions explicitly executes LOG_SYNC after calling LOG_END. LOG_SYNC wakes up the log write daemon to have its relevant log records saved into the log volume immediately. If the log write daemon is engaged in an I/O operation, the transaction should sleep until the I/O operation is completed.

Shortage of Log Write Buffer Space

The log write daemon operates at predetermined intervals to flush the log write buffer. However, large consecutive transaction logs could quickly consume the space before the log write daemon wakes up. To avoid the buffer overflow, the log write daemon is activated to force out the current buffer contents to the log volume.

Suppose, for example, that a transaction is attempting to send out its log record in LOG_END phase. The system then compares the log size with the current free space available in the log write buffer. If the free space is insufficient, the system wakes up the log write daemon. The transaction enters the sleep state and waits until the log write daemon alternates the operation mode of two log write buffers. If the log write daemon is engaged in an I/O operation and the current log write buffer in append mode has little free space, the transaction has no choice but to wait.

Shortage of Metadata Cache Space

Transactions manipulate metadata objects on the metadata cache, which are fetched on demand from metadata volumes. Therefore, when the metadata cache is filled to capacity, the ongoing transactions cannot proceed to further steps, without forcing out some of the cache entries. Suppose that a transaction is attempting to make access to a certain metadata object that is not in the metadata cache. If all the metadata entries in the cache are flagged "dirty" (i.e., modified), and if some of them are chained in the log write waiting list, the system activates the log write daemon.

Unmount File System

To safely unmount a file system, it is absolutely necessary to write all pending logs into the log volume beforehand. For this reason, the log write daemon must be woken up in the course of the unmounting process. Since it is ensured here that no transactions related to the file system are running, the log write daemon only has to write out the current contents of the log write buffer. The log write daemon enters to the sleep state again after finishing this log writing operation.

(3) Metadata Cache Management

This section explains how to manage the metadata cache. The system has a structure named "metadatalist" to control each individual entry of the metadata cache. This metadatalist structure consists of the following elements:

Metadata object pointer
Transaction list pointer
Metadata write list pointer (previous)
Metadata write list pointer (next)
Log write waiting list pointer (previous)
Log write waiting list pointer (next)
Log sequence number
Log block offset
Transaction ID
Status flags Metadata type buf structure entity where the terms "previous" and "next" in parentheses denote that the pointers are directed to the previous and next entries of a relevant linked list, respectively.

(3.1) State Transition of Metadata

The metadatalist structure takes the following six states:

Free space updated

Extent updated

Transaction in progress

Log write waiting

Ready to write back

I/O in progress

The state of a metadatalist structure is indicated by its status flags. In connection with those states, there are five kinds of linked lists having independent terminals.

TRANS list

BTF list

BTA list

Metadata write list

Log write waiting list

Every metadatalist structure is chained in one or more of those lists with no exceptions. The following will provide the details of the six states of metadatalist structures.

(a) Free-space-updated State

As previously described, when a transaction has updated a specific metadata object managing free storage space, the object should be chained in a list for later log collection. This list, called a "BTF list," is created for each ongoing transaction. When a transaction is committed, all metadata objects chained in its relevant BTF list will be copied to a log buffer, and the compiled log record is written to the log volume. The BTF list is a singly-linked circular list formed by using the "Transaction list pointer" field of metadatalist structures.

If a metadata object is in this free-space-updated state, it means that the log of the object has not yet saved into the log volume, and thus the object may be modified again. Even when another update is made to the same object, the existing link in the BTF list does not change. Needless to say, such an update to the metadata object should not be reflected in the metadata volumes until the logging system saves its record.

(b) Extent-updated State

In the present embodiment, file systems are managed on an extent basis; i.e., the allocation of storage space and disk I/O operations to and from a file will be done in units of multiple blocks. The inode structure of this file system allows a file to contain indirect extent blocks. Transactions may update a particular indirect extent block multiple times, as in the case of the free space information described in the previous item (a). For this reason, such metadata objects are chained in a list structure called the "BTA list" during a transaction. The BTA list is a singly-linked circular list formed by using the "Transaction list pointer" field of metadatalist structures. When the transaction is committed, all metadata objects chained in this BTF list will be copied to a log buffer, and the compiled log record is written to the log volume. Note that a separate BTA list is created for each individual transaction.

If a metadata object is in this extent-updated state, it means that the log of the object has not yet saved into the log volume, and thus the same transaction may modify the object again. However, even when another update is made to the same indirect extent block, the existing link in the BTA list does not change. Needless to say, this update should not be reflected in the metadata volumes until the logging system saves its record.

(c) Transaction-in-progress State

This state denotes that the metadata object of interest has been modified by an ongoing transaction, whose log buffer contains a log entry showing the result of the modification. This log record, however, has not yet been sent to the log volume, because the transaction is still in process. The modified metadata has to stay in the metadata cache for the same reason.

No other transactions can read or write those metadata objects in this state, because they are locked to a specific transaction. Such objects are chained in a singly-linked circular list structure that is created for each individual transaction. This list is called the "TRANS list." The terminals of TRANS lists organize an array consisting of as many elements as the maximum number of concurrent transactions. Those elements are indexed by the log buffer number, or transaction ID. As already mentioned in (a) and (b), the TRANS list, BTF list, and BTA list share the same pointer field in the metadatalist structure. The TRANS list may contain a metadata object that also belongs to the metadata write list or log write waiting list described below.

(d) Log-write-waiting State

This state denotes that the metadata object of interest was modified by a specific transaction, but its log record has not yet been transferred to the log volume. In other words, although the transaction has already finished, its relevant log record still stays in the log write buffer, since the log write daemon is sleeping. (While the daemon performs a synchronous write, this appears asynchronous to the transaction.)

Metadata objects in this log-write-waiting state are chained in a doubly-linked circular list structure, called the "log write waiting list." When a transaction is finished, its relevant entries in the TRANS list are transported to this log write waiting list. In the case of a big transaction, the entries in the BTF list are also transported to the waiting list. The log write waiting list thus grows like a queue each time a transaction is finished. Since this list operates in conjunction with the log write buffer, the logging system employs two instances of the log write waiting list.

Because metadata objects chained in the log write waiting list are not locked, other ongoing transactions may overwrite them, while their logs are still in the log write buffer. If this happens to a certain metadata object, the logging system updates solely the status flags in the relevant metadatalist structure, while preserving its link to the log write waiting list.

(e) Ready-to-write-back State

This state denotes that the metadata object of interest can be written back to its home metadata volume at any time, since its log record has been saved into the log volume. Such metadata objects are chained in a doubly-linked circular list structure, called the "metadata write list." Unlike the other lists described above, the metadata write list has no clones. The metadata writing daemon uses the list to write updated metadata back to the metadata volumes.

Metadata objects in the ready-to-write-back state may be updated again by an ongoing transaction, since they are not locked. If this happens to a certain metadata object, the logging system updates solely the status flags in the relevant metadatalist structure, while preserving its position in the metadata write list. Suppose, for example, that a certain metadata object chained in the metadata write list is modified by another transaction. This metadata object has to migrate to the transaction-in-progress state. Then, completion of this transaction leads it to the log-write-waiting state. At this point, the metadata object is chained in both the log write waiting list and metadata write list. As the log write daemon writes logs to the log volume, their corresponding entries will be added to the metadata write list accordingly. In this situation, the metadata write list has to maintain the entry of a metadata object if it is chained in the list already.

(f) I/O-in-progress State

This state indicates that the metadata object of interest is in the process of asynchronous I/O operation to the metadata volumes, but its completion has not yet been signaled by the metadata write daemon. Any ongoing transactions cannot write the object, while read access is allowed. Those metadata objects are still chained in the metadata write list.

(3-2) Overwriting Log Volume

While log records are produced endlessly, their storage space is limited in capacity. The logging system thus has to reuse the limited log volume in a cyclical manner, overwriting old records with new records. To safely overwrite an existing record in the log volume, the logging system must ensure that all updates made by a relevant transaction have been reflected in the metadata volumes. To manage the overwriting, the logging system provides parameters called the "log sequence number" and "log block offset" as part of the metadatalist structure. These parameters are changed by the metadata writing daemon and read by the log write daemon.

(a) Log Sequence Number

Log sequence number is given to each log block when it is copied from a log buffer to a log write buffer in response to the commitment of a transaction. This number is identical to what is found in the BEGIN mark or END mark of each log block. Once assigned to a metadata object chained in the metadata write list, the log sequence number will not be changed, even if the same object is modified again.

(b) Log Block Offset

The log volume holds a series of log blocks which record the activities of different transactions. As a member element of the metadatalist structure, the parameter "log block offset" gives the head offset address of a specific log block within the log volume.

Recall that, in LOG_END phase of a specific transaction, the logging system transfers its relevant log block (i.e., the log buffer contents) to the log write buffer. At this time, the logging system calculates the log block offset of this transaction from the location of its log block within the log write buffer and the offset address given by the current log write pointer. Then the system sets the calculated log block offset to all relevant metadatalist structures that are identified by tracing the relevant TRANS list. (The TRANS list shows which metadata objects were updated by a specific transaction, and the log block offset information should be set to metadatalist structures relevant to those metadata objects)

The log write daemon uses the log block offset information when writing pending log records. More specifically, the log write daemon first obtains a log block offset value by referring to the metadatalist structure located at the top of the relevant metadata write list. It then calculates the sum of the current log write pointer value and the size of log records in the log write buffer. Only when the calculated sum does not exceed the log block offset value, the log write daemon transfers the log records to the log volume.

(3.3) Writing Back to Metadata Volumes

As previously noted, metadata objects updated by a transaction have to stay in the metadata cache until its relevant log record is saved to the log volume. To observe this mandatory rule, all the objects on the metadata cache are chained in some linked lists, depending on their respective states. The metadata write list is the only list containing such metadata objects that can be written back to their home metadata volumes.

Since the task of writing back metadata objects involves time-consuming disk I/O operations, it would be better to execute that as an independent thread separate from transactions themselves. This thread is the metadata write daemon, which focuses its attention on the metadata write list. It determines whether to issue I/O commands and writes the listed metadata objects back to the metadata volumes through a buf structure associated therewith. After that, the daemon removes those metadata object entries from the list, thereby resetting them to the "clean" state.

(3.4) Metadata Write Daemon

The system creates the metadata write daemon when mounting a file system, and terminates it when unmounting the file system. This means that a separate thread is created for each file system.

All metadata objects in the ready-to-write-back state are chained in the metadata write list. Referring to this list, the metadata writing daemon transfers those objects to their home metadata volumes asynchronously. Since the objects are locked during the write back operation, transactions wishing to update them must wait until the I/O is finished.

As a result of the above, the updates made to the file system by the past transactions are reflected in the metadata volumes. This, in turn, means that their corresponding log records in the log volume are now obsolete, and can be overwritten with new records, if required. In other words, the write back operation enlarges the free space in the log volume.

It should be noted, however, that the metadata write list entries may include such an object that has encountered another update by some ongoing transaction before it is written back to its home metadata volume. Since such a metadata object enters again to the transaction-in-progress state or the like, the metadata write daemon cannot write it back to its home metadata volume, although it still belongs to the metadata write list. Even in this situation, the metadata write daemon can issue asynchronous write commands to write back the other pending metadata objects. However, it is not possible for the daemon to enlarge the free space in the log volume.

The metadata write daemon is activated by various internal and external events as will be described below in (3.4.1) through (3.4.3). The activation process is slightly affected by the system's status, including free space available in the log volume and metadata cache. The following will provide the detailed process, which may include some functions called not only by the daemon, but also by some other drivers.

(3.4.1) Autonomous Activation

The metadata write daemon has an integral timer to wake up itself at appropriate intervals. When activated, the metadata write daemon traces the metadata write list to find some metadata objects in the ready-to-write-back state, and then writes them back to their respective metadata volumes. It should be noted here that the daemon issues an asynchronous write request for a predetermined number of objects, rather than attempting to force out all the list entries in a single I/O operation.

The metadata write daemon reduces the metadata write list entries gradually and regularly in the way described above. This method is advantageous in averaging disk I/O traffic and avoiding activation due to the shortage of resources. Briefly, the metadata write daemon operates according to the following steps when it is autonomously activated.

(a) Get the number of metadata write list entries
(b) Examine each metadata state
(c) Issue asynchronous write request
(d) Check the result of I/O operation
(e) Remove metadata write list entries
(f) Repeat (b) to (e) a predefined number of times
(g) Enter sleep state The following will now provide detailed operations at each step (a) to (g).

(a) Get the Number of Metadata Write List Entries

The metadata write daemon gets the number of metadata write list entries at predefined intervals.

More specifically, it examines the terminal of the metadata write list, where the number of entries is recorded. If there are not so many entries are chained in the list, the daemon skips metadata write operation.

(b) Examine Each Metadata State

Basically, metadata objects chained in the metadata write list are in the ready-to-write-out state, meaning that their log records have already been saved in the log volume. However, those objects are still open to modification by other transactions. If modified, their state would return to the transaction-in-progress state, in which state no metadata write operation can take place. Therefore, the metadata write daemon examines the state of each metadata object before writing it back to the metadata volume. If the object is not in the ready-to-write-out state, the daemon skips it and examines the next object in the list.

(c) Issue Asynchronous Write Request

If the metadata object of interest is in the ready-to-write-back state, then the metadata write daemon changes it to I/O-in-progress state, and issues an I/O request using a buf structure contained in its corresponding metadatalist structure. No transactions can update this metadata object in the I/O-in-progress state. The daemon proceeds to the next step without seeing the result of the ongoing disk I/O operation, because it is an asynchronous write request.

(d) Check the Result of I/O Operation

The result of the I/O operation is examined by a function integrated in b_iodone, a member of buf structure. This function calls an error test routine, based on buf structure, which is given to the function as its argument. If any error is detected, the process advances to an appropriate error handler (no details provided here). If the I/O is successfully finished, the number of clean metadata objects increases by one. This number is separately managed for each type of metadata (e.g., inode, Vdata).

(e) Remove Metadata Write List Entries (b_iodone)

The function of b_iodone also manages the metadata write list. The upper-layer structure of the given argument (i.e., buf structure) is the metadatalist structure describing the object of interest. The function manipulates this metadatalist structure, resetting its I/O-in-progress flag and removing its link to the metadata write list. It also changes the metadata object from "dirty" state to "clean" state. This dirty/clear state is maintained in each metadata object's structure, which is pointed at by an element in the metadatalist structure. The metadata write daemon releases (or unlocks) the metadatalist structure when the above steps are all finished.

(f) Repeat (b) to (e) a Predefined Number of Times

The metadata write daemon then repeats processing of metadata objects a predefined number of times, tracing links in the metadata write list. The loop count does not include such objects that are not in the ready-to-write-out state. Needless to say, the daemon will stop repeating when the metadata write list becomes exhausted before the loop count reaches the predefined number.

(g) Enter Sleep State

The metadata write daemon sleeps until the timer expires again or some external event (e.g., shortage of resources) occurs.

(3.4.2) Activation in Normal Situations

The metadata write daemon wakes up and provides services when the system falls into either of the following situations.

Insufficient Free Space in Log Volume

The log write daemon checks how much free space remains in the log volume before it writes forces out the log write buffer contents. The metadata writing daemon is activated if the remaining free space falls short of a predetermined threshold.

Insufficient Free Space in Metadata Cache

The number of clean metadata objects is decremented each time an updated metadata object is unlocked by a transaction. If this number falls below a predetermined threshold, the metadata write daemon should be activated.

Woken up by the above events, the metadata write daemon operates according to the following steps.

(a) Examine each metadata state
(b) Issue asynchronous write request
(c) Check the result of I/O operation
(d) Remove metadata write list entries
(e) Repeat (a) to (d) for all list entries
(f) Enter sleep state For the details of steps (a) to (d) and (f), refer to steps (b) to (e) and (g) in the previous item (3.4.1) titled "Autonomous activation."

At step (e), the metadata write daemon repetitively processes the relevant metadata objects for all entries in the metadata write list. Because it simply skips metadata objects that are not in the ready-to-write-out state, some relatively old object could stay at the top of the resultant metadata write list. This may not be the best result, since it does not contribute so much to the expansion of free space in the log volume. In normal situations, however, no further action will be taken.

(3.4.3) Activation in Critical Situations

The metadata write daemon has to wake up and provide services when the system falls into more serious situations such as:

Log volume is nearly exhausted
Metadata cache is nearly exhausted

Woken up by the above events, the metadata write daemon operates according to the following steps.

(a) Restrict the acceptance of new transactions
(b) Examine each metadata state
(c) Issue asynchronous write request
(d) Wake up log write daemon if appropriate
(e) Check the result of I/O operation
(f) Remove metadata write list entries
(g) Repeat (b) to (f) for all list entries
(h) Repeat until shortage is resolved
(i) Accept new transactions
(j) Enter sleep state The following will provide the detailed operation of the system at each step (a) to (j).

(a) Restrict the Acceptance of New Transactions

In critical situations, the system stops the acceptance of new transactions. More specifically, it does not allocate log buffers to new transactions, causing them to enter the sleep state in their BEGIN declaration stages. The system provides a dedicated flag for this purpose. Every transaction has to refer to the flag when making its BEGIN declaration. (b), (c), (e), (f), (g)

These five steps are executed in the same way as the steps (a) to (e) in the normal situations. In short, the metadata write daemon picks up a metadata entry linked at the top of the metadata write list, and issues an asynchronous write request so as to write the metadata to its relevant volume, if it is in the ready-to-write-back state.

(d) Wake up Log Write Daemon, if Appropriate

The logging system leaves its log writing tasks to the log write daemon, an agent process running independently of transactions. Completion of a transaction does not necessarily means immediate transmission of log records to the log volume. This suggests that the metadata cache may contain some metadata objects that cannot be written back to the metadata volumes because their log records are not yet saved in the log volume. If such metadata objects are present, the system forcibly wakes up the log write daemon, so that the objects will migrate to the ready-to-write-back state. If the daemon is already running, this step (d) will be simply skipped.

(h) Repeat Until Shortage is Resolved

The system investigates the availability of storage resources at present. If the free space in the log volume or metadata volume has not yet recovered to the level that would activate the metadata write daemon, then the system will attempt to force out the metadata write list entries again. This action is based on the expectation that the step (d) must have advanced the log write operations. It is expected that more cache space will be gained by repeating the above multiple times, as well as restricting the acceptance of new transactions.

(i) Accept New Transactions

The system resumes the acceptance of new transactions, which have been restricted since step (a).

(j) Enter Sleep State

The metadata write daemon enters the sleep state, while setting its integral timer for the next wake-up.

(4) Metadata Allocation and Deallocation

Metadata allocation map is a bitmap used to control the allocation and deallocation of metadata objects. This map is divided into a plurality of bitmap blocks. Each block has distinctive states, named "Deallocation-Dirty" and "Allocation-Dirty." The system does not use Deallocation-Dirty bitmap blocks when allocating metadata objects.

More specifically, the proposed system manipulates bitmap blocks in the following manner.

Bitmap blocks are loaded to the cache memory when a file system is mounted. At this stage, one of the loaded bitmap blocks is nominated as the allocation control map which is dedicated to metadata allocation purpose. For simplicity, consider that the first-loaded bitmap block serves as the allocation control block.

The system creates a replica of the allocation control block.

When allocating a specific metadata object, the system searches the replicated version of the allocation control block. If an appropriate free object is found, the system sets the corresponding bit in both the replica and original bitmap block.

When deallocating a specific metadata object, the system manipulates solely the original bitmap block.

In the course of metadata allocation tasks, the replicated allocation control block will be filled with "1s" because no deallocation operations affect the block. Finally, this block becomes unable to provide further metadata resources. In this case, the system creates a new allocation control block by selecting from among those on the cache memory and replicating the selected block. This new allocation control block has to be Clean or Allocation-Dirty.

If all the bitmap blocks on the cache memory are Deallocation-Dirty, the system has to force out one block and load a new block from the secondary storage, by using known cache management algorithms. A replica of newly loaded block will now serve as the allocation control block.

The bitmap block selected as the allocation control block will never be forced out of the cache, even when the cache is tight. This bitmap block may be rendered "Clean" when it is chained in the metadata write list and then written back to the metadata volume. Its replica, however, should not be refreshed in such cases.

The proposed processing mechanisms are actually implemented as software functions of a computer system. The process steps described so far are encoded in a computer program and stored in a computer-readable storage medium. The computer system executes such programs to provide the intended functions of the present invention. The suitable computer-readable storage media include magnetic storage media and solid state memory devices. Some portable storage media, such as CD-ROMs (Compact Disk Read Only Memory) and floppy disks, are also suitable for circulation purposes. Further, it will be possible to distribute the programs through an appropriate server computer deployed on a network. The program file delivered to users is normally installed in their computer's hard drive or other local mass storage devices. The programs will be executed after being loaded to the computer's main memory.

The above explanation will now be summarized as follows.

According to the first aspect of the present invention, the collected log records include metadata descriptors indicating in which volume each recorded metadata object should be stored. This feature permits the system to support multi-volume configurations for metadata storage. When replaying log records, metadata descriptors immediately provide the location of each recorded metadata object, and thus the file systems can be quickly repaired even in a multi-volume environment.

According to the second aspect of the present invention, the logging system always updates valid log range information indicating which part of the log volume holds essential log records. When restoring file systems, the log replay program only has to replay the records within the valid log range, rather than scanning the entire log volume. This feature of the invention improves the efficiency of log replaying operations.

According to the third aspect of the present invention, the logging system assigns a sequence number to each log record at the end of a transaction. Here, the range of sequence numbers is determined such that the logging system can continue to supply valid numbers in ascending order, throughout the computer system's lifetime and beyond. Since the log volume can be reused without initializing it to zeros, the time required for file system recovery will be greatly reduced.

According to the fourth aspect of the present invention, the logging system only records final images of objects if they are such metadata objects that tend to be updated many times by a single transaction. This mechanism compress the resultant log data, as well as reducing the time required for log replay operations when restoring file systems. The present invention thus contributes to improved availability of a computer system.

According to the fifth aspect of the present invention, the data processing system manages the allocation of metadata resources on the basis of allocation management data, together with its partial copy. This partial copy is used to allocate resources, but not affected by any events that deallocate the resources. This mechanism prevents any deallocated metadata resource from being immediately reallocated to another transaction. Even if the deallocation process is interrupted by a system crash, the metadata resource that the interrupted transaction was attempting to release is guaranteed to recover its previous state where the deallocation process has not yet effected.

According to the sixth aspect of the present invention, the logging system logs resource allocation and deallocation operations by recording the location of each specific resource that is assigned or freed, rather than saving a snapshot of the allocation map at each moment. This feature greatly reduces the amount of log records to be produced, as well as alleviating the logging workload imposed on the system.

According to the seventh aspect of the present invention, the logging system divides its log cache into a plurality of log buffers of various sizes, supplying different types of transactions with their suitable log buffers. This multiple log buffer configuration enhances the independence of individual transactions, as well as enabling more efficient use of limited memory resources.

According to the eighth aspect of the present invention, the logging system produces and writes out an interim log block to the log volume when the log buffer is about to overflow. Since the log replayer program treats these interim log blocks as a single transaction log, it is possible to recover the file systems without problem. Further, each interim log block contains parameters given to the transaction in process. When the system crashed in the middle of a big transaction, the interim log blocks makes it possible for the log replayer program to redo the unfinished transaction, while maintaining correct semantics of operations.

According to the ninth aspect of the present invention, the data processing system has a mechanism to control whether to accept new transactions, according to the status of its integral logging system. Preventing the system from being disrupted by a shortage of memory resources, this mechanism enables highly concurrent execution of multiple transactions.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data processing system with a logging mechanism which stores log records for repairing an inconsistent file system, the system comprising:

a primary storage subsystem;

a secondary storage subsystem;

a plurality of metadata volumes, created in said secondary storage subsystem, which store a plurality of metadata objects describing files;

a log volume, created in said secondary storage subsystem, which stores log records describing updates made to the metadata objects;

a metadata cache, created in said primary storage subsystem, which temporarily stores the metadata objects;

metadata loading means, responsive to a transaction attempting to update metadata objects, for loading the requested metadata objects from said metadata volumes to said metadata cache;

metadata management means for holding metadata volume location identifiers associated with the metadata objects loaded to said metadata cache, the metadata volume location identifiers indicating in which of said metadata volumes the metadata objects were stored;

log collection means for collecting log records which indicate what updates were made to the metadata objects in said metadata cache, the log records containing the metadata volume location identifiers corresponding to the updated metadata objects;

a log buffer which stores the log record collected by said log collection means; and log writing means for transferring the log records from said log buffer to said log volume.

2. A data processing system with a logging mechanism which stores log records for repairing an inconsistent file system, the system comprising:

a primary storage subsystem;

a secondary storage subsystem;

a metadata volume, created in said secondary storage subsystem, which store a plurality of metadata objects describing files;

a log volume, created in said secondary storage subsystem, which stores log records describing updates made to the metadata objects;

a metadata cache, created in said primary storage subsystem, which temporarily stores the metadata objects;

metadata loading means, responsive to a transaction attempting to update metadata objects, for loading the requested metadata objects from said metadata volume to said metadata cache;

log collection means for collecting log records which indicate what updates were made to the metadata objects in said metadata cache;

a log buffer which stores the log record collected by said log collection means;

log writing means for transporting the log records from said log buffer to said log volume at regular intervals, using storage space of said log volume as a circular buffer;

metadata writing means for writing back the updated metadata objects from said metadata cache to said metadata volume;

valid log range monitoring means for observing the writing back operation performed by said metadata writing means so as to check which updated metadata object has been written back to said metadata volume, and based on the observation, identifying a particular set of log records stored in said log volume as valid log records, the particular set of log records corresponding to such updated metadata objects that have not yet been written back to said metadata volume; and file system restoration means, responsive to a file system restoration request, for correcting inconsistencies in the metadata objects stored in said metadata volume by using the valid log records identified by said valid log range monitoring means.

3. A data processing system with a logging mechanism which stores log records for repairing an inconsistent file system, the system comprising:

a primary storage subsystem;

a secondary storage subsystem;

a metadata volume, created in said secondary storage subsystem, which store a plurality of metadata objects describing files;

a metadata cache, created in said primary storage subsystem, which temporarily stores the metadata objects;

metadata loading means, responsive to a transaction attempting to update metadata objects, for loading the requested metadata objects from said metadata volume to said metadata cache; and log collection means for examining what type of transaction is in progress, to determine whether the current transaction is likely to make a plurality of updates to a single metadata object, and if the current transaction is likely to do so, collecting only the final state of the updated metadata object.

4. A computer-readable medium storing a computer program for file system management which collects transmission log records for repairing an inconsistent file system, the computer program being designed to run on a computer having primary and secondary storage subsystems in order to cause the computer to function as:

a plurality of metadata volumes, created in the secondary storage subsystem, which store a plurality of metadata objects describing files;

a log volume, created in the secondary storage subsystem, which stores log records describing updates made to the metadata objects;

a metadata cache, created in the primary storage subsystem, which temporarily stores the metadata objects;

metadata loading means, responsive to each transaction attempting to updated metadata objects, for loading the requested metadata objects from said metadata volume to said metadata cache;

metadata management means for holding metadata volume location identifiers associated with the metadata objects loading to said metadata cache, the metadata volume location identifiers indicating in which of said metadata volumes the metadata objects were stored;

log collection means for collecting log records which indicate what updates were made to the metadata objects in said metadata cache, the log records containing the metadata volume location identifiers corresponding to the updated metadata objects;

a log buffer which stores the log record collected by said log collection means; and log writing means for transporting the log records from said log buffer to said log volume.

5. A computer-readable medium storing a computer program for file system management which collects transmission log records for repairing an inconsistent file system, the computer program being designed to run on a computer having primary and secondary storage subsystems in order to cause the computer to function as:

a metadata volume, created in the secondary storage subsystem, which stores a plurality of metadata objects describing files;

a log volume, created in the secondary storage subsystem, which stores log records describing updates made to the metadata objects;

a metadata cache, created in the primary storage subsystem, which temporarily stores the metadata objects;

metadata loading means, responsive to each transaction attempting to update metadata objects, for loading the requested metadata objects from said metadata volume to said metadata cache;

log collection means for collecting log records which indicate what updates were made to the metadata objects in said metadata cache;

a log buffer which stores the log record collected by said log collection means;

log writing means for transporting the log records from said log buffer to said log volume at regular intervals, using storage space of said log volume as a circular buffer;

metadata writing means for writing back updated metadata objects from said metadata cache to said metadata volume;

valid log range monitoring means for observing the writing back operation performed by said metadata writing means so as to check which updated metadata object has been written back to said metadata volume, and based on the observation, identifying a particular set of log records stored in said log volume as valid log records, the particular set of log records corresponding to such updated metadata objects that have not yet been written back to said metadata volume; and file system restoration means, responsive to a file system restoration request, for correcting inconsistencies in the metadata objects stored in said metadata volume by using the valid log records identified by said valid log range monitoring means.

6. A computer-readable medium storing a computer program for file system management which collects transmission log records for repairing an inconsistent file system, the computer program being designed to run on a computer having primary and secondary storage subsystems in order to cause the computer to function as:

a metadata volume, created in the secondary storage subsystem, which store a plurality of metadata objects describing files;

a metadata cache, created in the primary storage subsystem, which temporarily stores the metadata objects;

metadata loading means, responsive to each transaction attempting to update metadata objects, for loading the requested metadata objects from said metadata volume to said metadata cache; and log collection means for examining what type of transaction is in progress, to determine whether the current transaction is likely to make a plurality of updates to a single metadata object, and if the current transaction is likely to do so, collecting only the final state of the updated metadata object.

7. A computer-readable medium storing a computer program for file system management which collects transmission log records for repairing an inconsistent file system, the computer program being designed to run on a computer having primary and secondary storage subsystems in order to cause the computer to function as:

allocation management data memory means for holding allocation management data for use in controlling allocation of metadata objects;

metadata allocation means, responsive to a first transaction requesting allocation of a free metadata object, for searching the allocation management data to find and allocate a free metadata object to the first transaction, and updating the allocation management data so as to indicate that the allocated metadata object is in use;

metadata deallocation means, responsive to a second transaction requesting deallocation of a specific metadata object being allocated, for updating the allocation management data so as to indicate that the specified metadata object is free; and log collection means for collecting log records describing which part of the allocation management data was modified by the metadata allocation means and metadata deallocation means;

wherein each collected log record describes only a single resource allocated or deallocated to/from a single transaction.

8. A data processing system with a logging mechanism which stores log records for repairing an inconsistent file system, the system comprising:

allocation management data memory means for holding allocation management data for use in controlling allocation of metadata objects;

metadata allocation means, responsive to a first transaction requesting allocation of a free metadata object, for searching the allocation management data to find and allocate a free metadata object to the first transaction, and updating the allocation management data so as to indicate that the allocated metadata object is in use;

metadata deallocation means, responsive to a second transaction requesting deallocation of a specific metadata object being allocated, for updating the allocation management data so as to indicate that the specified metadata object is free; and log collection means for collecting log records describing which part of the allocation management data was modified by the metadata allocation means and metadata deallocation means;

wherein each collected log record describes only a single resource allocated or deallocated to/from a single transaction.

9. The data processing system according to claim 8, wherein said single resource comprises a single data bit.

* * * * *